United States Patent
Teng et al.

(10) Patent No.: US 11,639,178 B2
(45) Date of Patent: May 2, 2023

(54) VEHICLE CONTROL METHOD AND DEVICE

(71) Applicant: Huawei Technologies Co., Ltd., Shenzhen (CN)

(72) Inventors: Ting Teng, Shenzhen (CN); Yongsheng Zhang, Shanghai (CN); Guangyi Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 118 days.

(21) Appl. No.: 17/186,734

(22) Filed: Feb. 26, 2021

(65) Prior Publication Data

US 2021/0206383 A1   Jul. 8, 2021

Related U.S. Application Data

(63) Continuation of application No. PCT/CN2019/103790, filed on Aug. 30, 2019.

(30) Foreign Application Priority Data

Aug. 31, 2018   (CN) .......................... 201811016852.4

(51) Int. Cl.
*B60W 40/114* (2012.01)
*B60W 30/02* (2012.01)
*B60W 50/00* (2006.01)

(52) U.S. Cl.
CPC .......... *B60W 40/114* (2013.01); *B60W 30/02* (2013.01); *B60W 50/0098* (2013.01);
(Continued)

(58) Field of Classification Search
CPC .............. B60W 40/114; B60W 30/02; B60W 50/0098; B60W 2050/0031;
(Continued)

(56) References Cited

U.S. PATENT DOCUMENTS

| 5,696,681 A | 12/1997 | Hrovat et al. |
| 6,498,967 B1 * | 12/2002 | Hopkins ............ B60G 17/0195 |
| | | 702/140 |
| 7,069,134 B2 | 6/2006 | Williams |
| 9,650,068 B1 * | 5/2017 | Ko ........................... B62D 6/04 |

(Continued)

FOREIGN PATENT DOCUMENTS

| CA | 2607002 C * | 7/2011 | .......... B60T 8/17551 |
| CN | 101570178 A | 11/2009 | |

(Continued)

OTHER PUBLICATIONS

CN-105799548-A translation (Year: 2016).*

(Continued)

*Primary Examiner* — Jeff A Burke
*Assistant Examiner* — Kyle T Johnson
(74) *Attorney, Agent, or Firm* — Huawei Technologies Co., Ltd.

(57) ABSTRACT

Embodiments of this application disclose a vehicle control method and device, where the method includes: calculating a longitudinal force interference compensation torque and a lateral force interference compensation torque of a vehicle when a flat tire occurs in the vehicle; calculating a feedback control torque of the vehicle; determining an additional yaw moment based on the longitudinal force interference compensation torque, the feedback control torque, and the lateral force interference compensation torque; and controlling, based on the additional yaw moment, a wheel in which the flat tire occurs.

14 Claims, 17 Drawing Sheets

(52) U.S. Cl.
CPC ............... *B60W 2050/0031* (2013.01); *B60W 2520/14* (2013.01); *B60W 2520/28* (2013.01); *B60W 2520/30* (2013.01); *B60W 2530/20* (2013.01); *B60W 2552/40* (2020.02); *B60W 2720/30* (2013.01)

(58) Field of Classification Search
CPC ......... B60W 2520/14; B60W 2520/28; B60W 2520/30; B60W 2530/20; B60W 2552/40; B60W 2720/30; B60W 40/1005; B60W 2050/0008; B60W 2050/0024; B60W 2720/14; B60W 2720/40; B60W 2720/403; B60W 2720/406; B60W 2520/125
See application file for complete search history.

(56) References Cited

U.S. PATENT DOCUMENTS

| | | | | |
|---|---|---|---|---|
| 2007/0067085 | A1* | 3/2007 | Lu | B60T 8/24 340/440 |
| 2013/0325283 | A1* | 12/2013 | Rylander | G06F 17/00 701/82 |
| 2018/0237001 | A1* | 8/2018 | Lian | B60L 3/0076 |
| 2019/0126976 | A1* | 5/2019 | Murayama | B60T 8/1755 |
| 2021/0188252 | A1* | 6/2021 | Lu | B60W 40/12 |

FOREIGN PATENT DOCUMENTS

| | | | |
|---|---|---|---|
| CN | 101712264 | A | 5/2010 |
| CN | 102407846 | A | 4/2012 |
| CN | 103415435 | A | 11/2013 |
| CN | 104773169 | A | 7/2015 |
| CN | 105799548 | A * | 7/2016 |
| CN | 105799548 | A | 7/2016 |
| CN | 108248454 | A | 7/2018 |
| DE | 102012222490 | A1 | 6/2013 |
| GB | 2441421 | A | 3/2008 |
| JP | 2007126056 | A | 5/2007 |
| WO | 2017095301 | A1 | 6/2017 |
| WO | 2018079469 | A1 | 5/2018 |

OTHER PUBLICATIONS

Development of Active Control Strategy for Flat Tire Vehicles (Year: 2014).*
Nonlinear Coordinated Motion Control of Road Vehicles After Tire Blowout (Year: 2016).*
Li, H., "Research on Dynamic Modeling and Active Control Algorithm of Tire Blow-out Vehicle", Apr. 2011, 106 pages.
Wang, F., "Research on Coordinated Motion Control Method for Road Vehicles after a Tire Blow-out", 2015, 142 pages.

* cited by examiner

VEHICLE CONTROL METHOD AND DEVICE

CROSS-REFERENCE TO RELATED APPLICATIONS

This application is a continuation of International Application No. PCT/CN2019/103790, filed on Aug. 30, 2019, which claims priority to Chinese Patent Application No. 201811016852.4, filed on Aug. 31, 2018. The disclosures of the aforementioned applications are hereby incorporated by reference in their entireties.

TECHNICAL FIELD

This application relates to the field of computer technologies, and in particular, to a vehicle control method and device.

BACKGROUND

A vehicle flat tire is a common dangerous situation. A large proportion of traffic accidents are caused by vehicle flat tires every year. Particularly, a flat tire that occurs when a vehicle is travelling at a high speed easily causes the vehicle to deviate from a normal travelling track, causing a major traffic accident. In a flat tire stabilization method in a current stage, compensation for a yaw moment generated by a longitudinal force of an automobile after a flat tire occurs is mainly considered. After the yaw moment generated by the longitudinal force is obtained through calculation, a braking moment is applied to a wheel in which no flat tire occurs, so that the vehicle travels in a direction as desired by a driver.

In an actual application, a lateral force is also an important factor that affects vehicle travelling. In addition, a flat tire of a vehicle affects performance of the vehicle, but a controller is designed based on vehicle parameters obtained when no flat tire occurs, and a problem of a delayed response of a yaw rate caused by the flat tire is not considered. Consequently, the applied braking moment may not enable the vehicle to travel in the direction as desired by the driver, and a control effect is poor.

SUMMARY

Embodiments of this application provide a vehicle flat tire control method and device, to quickly compensate for a yaw moment generated by a flat tire, and reduce a yaw degree of a vehicle, so that the vehicle travels in a direction as desired by a driver.

According to a first aspect, an embodiment of this application provides a vehicle control method, where the method includes: calculating a longitudinal force interference compensation torque and a lateral force interference compensation torque of a vehicle when a flat tire occurs in the vehicle; calculating a feedback control torque of the vehicle; determining an additional yaw moment based on the longitudinal force interference compensation torque, the feedback control torque, and the lateral force interference compensation torque; and controlling, based on the additional yaw moment, a wheel in which the flat tire occurs.

In this method, the lateral force interference compensation torque is added to the additional yaw moment, so that the additional yaw moment more accurately represents a torque required for controlling the vehicle in which the flat tire occurs, and a response time for adjusting a yaw rate of the vehicle in which the flat tire occurs to a desired yaw rate is reduced. In this way, a yaw moment generated by the flat tire can be quickly compensated, and a yaw degree of the vehicle can be reduced, so that the vehicle travels in a direction as desired by a driver.

With reference to the first aspect, in an optional implementation, the calculating a feedback control torque of the vehicle includes: calculating an absolute value of a desired yaw angular acceleration of the vehicle, and calculating a feedback gain based on the absolute value of the desired yaw angular acceleration; and calculating the feedback control torque based on the feedback gain.

In this manner, a feedback gain of a proportional-integral controller may be adjusted based on the absolute value of the desired yaw angular acceleration, so that a problem of a delayed response of the yaw rate of the vehicle in which the flat tire occurs can be alleviated, and the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

According to a second aspect, an embodiment of this application provides a vehicle control method, where the method includes: calculating a longitudinal force interference compensation torque of a vehicle when a flat tire occurs in the vehicle; calculating an absolute value of a desired yaw angular acceleration of the vehicle, and calculating a feedback gain based on the absolute value of the desired yaw angular acceleration; calculating a feedback control torque based on the feedback gain; determining an additional yaw moment based on the longitudinal force interference compensation torque and the feedback control torque; and controlling, based on the additional yaw moment, a wheel in which the flat tire occurs.

In this manner, the feedback gain may be calculated based on the absolute value of the desired yaw angular acceleration, so that a problem of a delayed response of a yaw rate of the vehicle in which the flat tire occurs can be alleviated, and a response time for adjusting the yaw rate of the vehicle in which the flat tire occurs to a desired yaw rate can be reduced. In this way, a yaw moment generated by the flat tire can be quickly compensated, and a yaw degree of the vehicle can be reduced, so that the vehicle travels in a direction as desired by a driver.

With reference to the second aspect, in an optional implementation, the method further includes: calculating a lateral force interference compensation torque when the flat tire occurs in the vehicle; and the determining an additional yaw moment based on the longitudinal force interference compensation torque and the feedback control torque includes: determining the additional yaw moment based on the longitudinal force interference compensation torque, the feedback control torque, and the lateral force interference compensation torque.

In this manner, the lateral force interference compensation torque is added to the additional yaw moment, so that the additional yaw moment more accurately represents a torque required for controlling the vehicle in which the flat tire occurs, and the response time for adjusting the yaw rate of the vehicle in which the flat tire occurs to the desired yaw rate is reduced. In this way, the yaw moment generated by the flat tire can be quickly compensated, and the yaw degree of the vehicle can be reduced, so that the vehicle travels in the direction as desired by the driver.

With reference to the first aspect or the second aspect, in an optional implementation, the calculating a feedback gain based on the absolute value of the desired yaw angular acceleration includes: determining, in a first preset relationship, an adjustment coefficient corresponding to the absolute value of the desired yaw angular acceleration, where the first preset relationship indicates a mapping relationship between absolute values of a plurality of desired yaw angular accelerations and a plurality of adjustment coefficients; and calculating the feedback gain based on the determined adjustment coefficient.

With reference to the first aspect or the second aspect, in an optional implementation, the calculating the feedback gain based on the determined adjustment coefficient includes: multiplying a basic feedback gain by the adjustment coefficient to obtain the feedback gain.

With reference to the first aspect or the second aspect, in an optional implementation, the first preset relationship is: if the absolute value of the desired yaw angular acceleration falls within [0, $n_1$], a corresponding adjustment coefficient is a, where a is a value in [2, 5]; or if the absolute value of the desired yaw angular acceleration falls within [$n_1$, $n_2$], a corresponding adjustment coefficient increases as the absolute value of the desired yaw angular acceleration increases, where the adjustment coefficient falls within [a, b]; or if the absolute value of the desired yaw angular acceleration falls within [$n_2$, $n_{th}$], the adjustment coefficient is b; or if the absolute value of the desired yaw angular acceleration falls within [$n_{th}$, $n_3$], a corresponding adjustment coefficient decreases as the absolute value of the desired yaw angular acceleration increases, where the adjustment coefficient falls within [b, c], and c is a value in [0, 1]; or if the absolute value of the desired yaw angular acceleration falls within [$n_3$, +∞), the adjustment coefficient is c.

In this manner, when the absolute value $|\dot{\gamma}^d|$ of the desired yaw angular acceleration is greater than $n_1$ and is less than $n_2$, a change trend of the adjustment coefficient is that the adjustment coefficient increases as $|\dot{\gamma}^d|$ increases, so that a degree of the delayed response of the yaw rate can be reduced, and the vehicle can quickly compensate for the yaw moment required by the vehicle. When $|\dot{\gamma}^d|$ is greater than the threshold $n_{th}$ and is less than $n_3$, the change trend of the adjustment coefficient is that the adjustment coefficient decreases as $|\dot{\gamma}^d|$ increases. In this manner, considering that the driver may over-correct a steering wheel due to panic after the flat tire occurs, excessive vehicle control caused by over-correction by the driver can be avoided by reducing the feedback gain.

With reference to the first aspect or the second aspect, in an optional implementation, when there is one wheel in which the flat tire occurs, the controlling, based on the additional yaw moment, a wheel in which the flat tire occurs includes: determining a distribution order and an action mode of a wheel torque required for control based on a value of the additional yaw moment, a position of the wheel in which the flat tire occurs, and vertical forces of wheels in which no flat tire occurs, where a value of the wheel torque required for control is a quotient obtained by dividing a product of the additional yaw moment and a wheel diameter by an average track of wheels; determining that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determining that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; when the absolute value of the wheel torque distributed to the second wheel is the maximum road surface friction torque of the second wheel, determining that an absolute value of a wheel torque distributed to a third wheel in the distribution order is a smaller value in a maximum road surface friction torque of the third wheel and an absolute value of a difference between the maximum road surface friction torque of the second wheel and the difference between the absolute value of the wheel torque required for control and the maximum road surface friction torque of the first wheel; and controlling the wheel in which the flat tire occurs, based on the distribution order and the action mode of the wheel torque required for control, the absolute value of the wheel torque distributed to the first wheel, the absolute value of the wheel torque distributed to the second wheel, and the absolute value of the wheel torque distributed to the third wheel.

In this manner, wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

With reference to the first aspect or the second aspect, in an optional implementation, after the determining that an absolute value of a wheel torque distributed to a first wheel in the distribution order is a smaller value in an absolute value of the wheel torque required for control and a maximum road surface friction torque of the first wheel, the method further includes: skipping distributing the wheel torques to the second wheel and the third wheel when the absolute value of the wheel torque distributed to the first wheel is the absolute value of the wheel torque required for control; and controlling the wheel in which the flat tire occurs, based on the distribution order and the action mode of the wheel torque required for control and the absolute value of the wheel torque distributed to the first wheel. In this manner, wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

With reference to the first aspect or the second aspect, in an optional implementation, after the determining that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel, the method further includes: skipping distributing the wheel torque to the third wheel when the absolute value of the wheel torque distributed to the second wheel is the absolute value of the difference between the absolute value of the wheel torque required for control and the maximum road surface friction torque of the first wheel; and controlling the wheel in which the flat tire occurs, based on the distribution order and the action mode of the wheel torque required for control, the absolute value of the wheel torque distributed to the first wheel, and the absolute value of the wheel torque distributed to the second wheel. In this manner, wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

With reference to the first aspect or the second aspect, in an optional implementation, the determining a distribution order and an action mode of a wheel torque required for control based on a value of the additional yaw moment, a position of the wheel in which the flat tire occurs, and a vertical force of a wheel in which no flat tire occurs includes: when the additional yaw moment is less than zero, determining that, in wheels in which no flat tire occurs, a wheel with a greater vertical force in wheels on a right side of a vehicle traveling direction is the first wheel, where an action mode of the wheel torque distributed to the first wheel is braking; and if in the wheels in which no flat tire occurs, there are two wheels on the right side of the vehicle traveling direction, determining that a wheel other than the first wheel in the wheels on the right side of the vehicle traveling direction is the second wheel, where an action mode of the wheel torque distributed to the second wheel is braking, and determining that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the right side of the vehicle traveling direction, determining that, in the wheels in which no flat tire occurs, a wheel that is diagonal to the first wheel is the second wheel, where an action mode of the wheel torque distributed to the second wheel is driving, and determining that a remaining wheel other than the first wheel and the second wheel in the wheels in which no flat tire occurs is the third wheel, where an action mode of the wheel torque distributed to the third wheel is driving.

With reference to the first aspect or the second aspect, in an optional implementation, the determining a distribution order and an action mode of a wheel torque required for control based on a value of the additional yaw moment, a position of the wheel in which the flat tire occurs, and a vertical force of a wheel in which no flat tire occurs includes: when the additional yaw moment is greater than zero, determining that, in wheels in which no flat tire occurs, a wheel with a greater vertical force in wheels on a left side of a vehicle traveling direction is the first wheel, where an action mode of the wheel torque distributed to the first wheel is braking; and if in the wheels in which no flat tire occurs, there are two wheels on the left side of the vehicle traveling direction, determining that a wheel other than the first wheel in the wheels on the left side of the vehicle traveling direction is the second wheel, where an action mode of the wheel torque distributed to the second wheel is braking, and determining that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the left side of the vehicle traveling direction, determining that, in the wheels in which no flat tire occurs, a wheel that is diagonal to the first wheel is the second wheel, where an action mode of the wheel torque distributed to the second wheel is driving, and determining that a remaining wheel other than the first wheel and the second wheel in the wheels in which no flat tire occurs is the third wheel, where an action mode of the wheel torque distributed to the third wheel is driving.

With reference to the first aspect or the second aspect, in an optional implementation, there are two wheels in which a flat tire occurs, and the controlling, based on the additional yaw moment, a wheel in which the flat tire occurs includes: determining a distribution order and an action mode of a wheel torque required for control based on a value of the additional yaw moment, positions of the wheels in which the flat tire occurs, and a vertical force of a wheel in which no flat tire occurs, where a value of the wheel torque required for control is a quotient obtained by dividing a product of the additional yaw moment and a wheel diameter by an average track of wheels; determining that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determining that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; and controlling, based on the distribution order and the action mode of the wheel torque required for control, the absolute value of the wheel torque distributed to the first wheel, and the absolute value of the wheel torque distributed to the second wheel, the wheels in which the flat tire occurs. In this manner, wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

With reference to the first aspect or the second aspect, in an optional implementation, after the determining that an absolute value of a wheel torque distributed to a first wheel in the distribution order is a smaller value in an absolute value of the wheel torque required for control and a maximum road surface friction torque of the first wheel, the method further includes: skipping distributing the wheel torque to the second wheel when the absolute value of the wheel torque distributed to the first wheel is the absolute value of the wheel torque required for control; and controlling the wheel in which the flat tire occurs, based on the distribution order and the action mode of the wheel torque required for control and the absolute value of the wheel torque distributed to the first wheel. In this manner, wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

With reference to the first aspect or the second aspect, in an optional implementation, the determining a distribution order and an action mode of a wheel torque required for control based on a value of the additional yaw moment, a position of the wheel in which the flat tire occurs, and a vertical force of a wheel in which no flat tire occurs includes: when the additional yaw moment is less than zero, if both the wheels in which the flat tire occurs are wheels on a left side of a vehicle traveling direction, determining that, in the wheels in which no flat tire occurs, a wheel with a greater vertical force is the first wheel, where an action mode of the wheel torque distributed to the first wheel is braking, and determining that a remaining wheel other than the first wheel in the wheels in which no flat tire occurs is the second wheel, where an action mode of the wheel torque distributed to the second wheel is braking; or if both the wheels in which the flat tire occurs are wheels on a right side of a vehicle traveling direction, determining that, in the wheels in which no flat tire occurs, a wheel with a greater vertical force is the first wheel, where an action mode of the wheel torque distributed to the first wheel is driving, and determining that a remaining wheel other than the first wheel in the wheels in which no flat tire occurs is the second wheel, where an action mode of the wheel torque distributed to the second wheel is driving; or if wheels in which the flat tire occurs are not wheels on a same side of a vehicle traveling direction, determining that a wheel on a right side of the vehicle traveling direction is the first wheel, where an action mode of the wheel torque distributed to the first wheel is braking, and determining that a remaining wheel other than the first wheel in the wheels in which no flat tire occurs is the second wheel, where an action mode of the wheel torque distributed to the second wheel is driving.

With reference to the first aspect or the second aspect, in an optional implementation, the determining a distribution order and an action mode of a wheel torque required for control based on a value of the additional yaw moment, a position of the wheel in which the flat tire occurs, and a vertical force of a wheel in which no flat tire occurs includes: when the additional yaw moment is greater than zero, if both the wheels in which the flat tire occurs are wheels on a left side of a vehicle traveling direction, determining that, in the wheels in which no flat tire occurs, a wheel with a greater vertical force is the first wheel, where an action mode of the wheel torque distributed to the first wheel is driving, and determining that a remaining wheel other than the first wheel in the wheels in which no flat tire occurs is the second wheel, where an action mode of the wheel torque distributed to the second wheel is driving; or if both the wheels in which the flat tire occurs are wheels on a right side of a vehicle traveling direction, determining that, in the wheels in which no flat tire occurs, a wheel with a greater vertical force is the first wheel, where an action mode of the wheel torque distributed to the first wheel is braking, and determining that a remaining wheel other than the first wheel in the wheels in which no flat tire occurs is the second wheel, where an action mode of the wheel torque distributed to the second wheel is braking; or if wheels in which the flat tire occurs are not wheels on a same side of a vehicle traveling direction, determining that a wheel on a left side of the vehicle traveling direction is the first wheel, where an action mode of the wheel torque distributed to the first wheel is braking, and determining that a remaining wheel other than the first wheel in the wheels in which no flat tire occurs is the second wheel, where an action mode of the wheel torque distributed to the second wheel is driving.

With reference to the first aspect or the second aspect, in an optional implementation, there are three wheels in which the flat tire occurs, and the controlling, based on the additional yaw moment, a wheel in which the flat tire occurs includes: determining an action mode of a wheel torque required for control based on a value of the additional yaw moment and a position of a wheel in which no flat tire occurs, where a value of the wheel torque required for control is a quotient obtained by dividing a product of the additional yaw moment and a wheel diameter by an average track of wheels; determining that an absolute value of a wheel torque distributed to the wheel in which no flat tire occurs is a smaller value in an absolute value of the wheel torque required for control and a maximum road surface friction torque of the wheel in which no flat tire occurs; and controlling, based on the action mode of the wheel torque required for control and the absolute value of the wheel torque distributed to the wheel in which no flat tire occurs, the wheels in which the flat tire occurs.

With reference to the first aspect or the second aspect, in an optional implementation, the determining an action mode of a wheel torque required for control based on a value of the additional yaw moment and a position of a wheel in which no flat tire occurs includes: when the additional yaw moment is less than zero, if the wheel in which no flat tire occurs is a wheel on a left side of a vehicle traveling direction, determining that an action mode of the wheel torque distributed to the wheel in which no flat tire occurs is driving, or if the wheel in which no flat tire occurs is a wheel on a right side of a vehicle traveling direction, determining that an action mode of the wheel torque distributed to the wheel in which no flat tire occurs is braking; or when the additional yaw moment is greater than zero, if the wheel in which no flat tire occurs is a wheel on a left side of a vehicle traveling direction, determining that an action mode of the wheel torque distributed to the wheel in which no flat tire occurs is braking, or if the wheel in which no flat tire occurs is a wheel on a right side of a vehicle traveling direction, determining that an action mode of the wheel torque distributed to the wheel in which no flat tire occurs is driving.

According to a third aspect, an embodiment of this application provides a vehicle control device, including a calculation unit, a determining unit, and a control unit, where the calculation unit is configured to calculate a longitudinal force interference compensation torque and a lateral force interference compensation torque of a vehicle when a flat tire occurs in the vehicle; the calculation unit is further configured to calculate a feedback control torque of the vehicle; the determining unit is configured to determine an additional yaw moment based on the longitudinal force interference compensation torque, the feedback control torque, and the lateral force interference compensation torque; and the control unit is configured to control, based on the additional yaw moment, a wheel in which the flat tire occurs.

According to this device, the lateral force interference compensation torque is added to the additional yaw moment, so that the additional yaw moment more accurately represents a torque required for controlling the vehicle in which the flat tire occurs, and a response time for adjusting a yaw rate of the vehicle in which the flat tire occurs to a desired yaw rate is reduced. In this way, a yaw moment generated by the flat tire can be quickly compensated, and a yaw degree of the vehicle can be reduced, so that the vehicle travels in a direction as desired by a driver.

With reference to the first aspect, in an optional implementation, the calculation unit is specifically configured to calculate an absolute value of a desired yaw angular acceleration of the vehicle, and calculate a feedback gain based on the absolute value of the desired yaw angular acceleration; and calculate the feedback control torque based on the feedback gain.

According to this device, the feedback gain may be calculated based on the absolute value of the desired yaw angular acceleration, so that a problem of a delayed response of the yaw rate of the vehicle in which the flat tire occurs can be alleviated, and the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

According to a fourth aspect, an embodiment of this application provides a vehicle control device, including a calculation unit, a determining unit, and a control unit, where the calculation unit is configured to calculate a longitudinal force interference compensation torque of a vehicle when a flat tire occurs in the vehicle; the calculation unit is further configured to calculate an absolute value of a desired yaw angular acceleration of the vehicle, and calculate a feedback gain based on the absolute value of the desired yaw angular acceleration; the calculation unit is further configured to calculate a feedback control torque based on an adjusted feedback gain; the determining unit is configured to determine an additional yaw moment based on the longitudinal force interference compensation torque and the feedback control torque; and the control unit is configured to control, based on the additional yaw moment, a wheel in which the flat tire occurs.

According to this device, the feedback gain may be calculated based on the absolute value of the desired yaw angular acceleration, so that a problem of a delayed response of a yaw rate of the vehicle in which the flat tire occurs can be alleviated, and a response time for adjusting the yaw rate of the vehicle in which the flat tire occurs to a desired yaw rate can be reduced. In this way, a yaw moment generated by the flat tire can be quickly compensated, and a yaw degree of the vehicle can be reduced, so that the vehicle travels in a direction as desired by a driver.

With reference to the fourth aspect, in an optional implementation, the calculation unit is further configured to calculate a lateral force interference compensation torque of the vehicle when the flat tire occurs in the vehicle; and the determining unit is specifically configured to determine the additional yaw moment based on the longitudinal force interference compensation torque, the feedback control torque, and the lateral force interference compensation torque. According to this device, the lateral force interference compensation torque is added to the additional yaw moment, so that the additional yaw moment more accurately represents a torque required for controlling the vehicle in which the flat tire occurs, and the response time for adjusting the yaw rate of the vehicle in which the flat tire occurs to the desired yaw rate is reduced. In this way, the yaw moment generated by the flat tire can be quickly compensated, and the yaw degree of the vehicle can be reduced, so that the vehicle travels in the direction as desired by the driver.

With reference to the third aspect or the fourth aspect, in an optional implementation, the calculation unit further includes a determining subunit and a calculation subunit, where the determining subunit is configured to determine, in a first preset relationship, an adjustment coefficient corresponding to the absolute value of the desired yaw angular acceleration, where the first preset relationship indicates a mapping relationship between absolute values of a plurality of desired yaw angular accelerations and a plurality of adjustment coefficients; and the calculating subunit is configured to calculate the feedback gain based on the determined adjustment coefficient.

With reference to the third aspect or the fourth aspect, in an optional implementation, the calculation subunit is specifically configured to multiply a basic feedback gain by the adjustment coefficient to obtain the feedback gain.

With reference to the third aspect or the fourth aspect, in an optional implementation, the first preset relationship is: if the absolute value of the desired yaw angular acceleration falls within $[0, n_1]$, a corresponding adjustment coefficient is a, where a is a value in $[2, 5]$; or if the absolute value of the desired yaw angular acceleration falls within $[n_1, n_2]$, a corresponding adjustment coefficient increases as the absolute value of the desired yaw angular acceleration increases, where the adjustment coefficient falls within $[a, b]$; or if the absolute value of the desired yaw angular acceleration falls within $[n_2, n_{th}]$, the adjustment coefficient is b; or if the absolute value of the desired yaw angular acceleration falls within $[n_{th}, n_3]$, a corresponding adjustment coefficient decreases as the absolute value of the desired yaw angular acceleration increases, where the adjustment coefficient falls within $[b, c]$, and c is a value in $[0, 1]$; or if the absolute value of the desired yaw angular acceleration falls within $[n_3, +\infty)$, the adjustment coefficient is c.

According to this device, when the absolute value $|\dot{\gamma}^d|$ of the desired yaw angular acceleration is greater than $n_1$ and is less than $n_2$, a change trend of the adjustment coefficient is that the adjustment coefficient increases as $|\dot{\gamma}^d|$ increases, so that a degree of the delayed response of the yaw rate can be reduced, and the vehicle can quickly compensate for the yaw moment required by the vehicle. When $|\dot{\gamma}^d|$ is greater than the threshold $n_{th}$ and is less than $n_3$, the change trend of the adjustment coefficient is that the adjustment coefficient decreases as $|\dot{\gamma}^d|$ increases. In this manner, considering that the driver may over-correct a steering wheel due to panic after the flat tire occurs, excessive vehicle control caused by over-correction by the driver can be avoided by reducing the feedback gain.

With reference to the third aspect or the fourth aspect, in an optional implementation, when there is one wheel in which the flat tire occurs, the control unit is specifically configured to: determine a distribution order and an action mode of a wheel torque required for control based on a value of the additional yaw moment, a position of the wheel in which the flat tire occurs, and a vertical force of a wheel in which no flat tire occurs, where a value of the wheel torque required for control is a quotient obtained by dividing a product of the additional yaw moment and a wheel diameter by an average track of wheels; determine that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determine that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; when the absolute value of the wheel torque distributed to the second wheel is the maximum road surface friction torque of the second wheel, determine that an absolute value of a wheel torque distributed to a third wheel in the distribution order is a smaller value in a maximum road surface friction torque of the third wheel and an absolute value of a difference between the maximum road surface friction torque of the second wheel and the difference between the absolute value of the wheel torque required for control and the maximum road surface friction torque of the first wheel; and control the wheel in which the flat tire occurs, based on the distribution order and the action mode of the wheel torque required for control, the absolute value of the wheel torque distributed to the first wheel, the absolute value of the wheel torque distributed to the second wheel, and the absolute value of the wheel torque distributed to the third wheel. According to this device, wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

With reference to the third aspect or the fourth aspect, in an optional implementation, the control unit is further configured to: skip distributing the wheel torques to the second wheel and the third wheel when the absolute value of the wheel torque distributed to the first wheel is the absolute value of the wheel torque required for control; and control the wheel in which the flat tire occurs, based on the distribution order and the action mode of the wheel torque required for control and the absolute value of the wheel torque distributed to the first wheel.

With reference to the third aspect or the fourth aspect, in an optional implementation, the control unit is further configured to: skip distributing the wheel torque to the third wheel when the absolute value of the wheel torque distributed to the second wheel is the absolute value of the difference between the absolute value of the wheel torque required for control and the maximum road surface friction torque of the first wheel; and control the wheel in which the flat tire occurs, based on the distribution order and the action mode of the wheel torque required for control, the absolute value of the wheel torque distributed to the first wheel, and the absolute value of the wheel torque distributed to the second wheel.

With reference to the third aspect or the fourth aspect, in an optional implementation, the control unit is further configured to: when the additional yaw moment is less than zero, determine that, in the wheels in which no flat tire occurs, a wheel with a greater vertical force in wheels on a right side of a vehicle traveling direction is the first wheel, where an action mode of the wheel torque distributed to the first wheel is braking; and if in the wheels in which no flat tire occurs, there are two wheels on the right side of the vehicle traveling direction, determine that a wheel other than the first wheel in the wheels on the right side of the vehicle traveling direction is the second wheel, where an action mode of the wheel torque distributed to the second wheel is braking, and determine that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the right side of the vehicle traveling direction, determine that, in the wheels in which no flat tire occurs, a wheel that is diagonal to the first wheel is the second wheel, where an action mode of the wheel torque distributed to the second wheel is driving, and determine that a remaining wheel other than the first wheel and the second wheel in the wheels in which no flat tire occurs is the third wheel, where an action mode of the wheel torque distributed to the third wheel is driving.

With reference to the third aspect or the fourth aspect, in an optional implementation, the control unit is further configured to: when the additional yaw moment is greater than zero, determine that, in the wheels in which no flat tire occurs, a wheel with a greater vertical force in wheels on a left side of a vehicle traveling direction is the first wheel, where an action mode of the wheel torque distributed to the first wheel is braking; and if in the wheels in which no flat tire occurs, there are two wheels on the left side of the vehicle traveling direction, determine that a wheel other than the first wheel in the wheels on the left side of the vehicle traveling direction is the second wheel, where an action mode of the wheel torque distributed to the second wheel is braking, and determine that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the left side of the vehicle traveling direction, determine that, in the wheels in which no flat tire occurs, a wheel that is diagonal to the first wheel is the second wheel, where an action mode of the wheel torque distributed to the second wheel is driving, and determine that a remaining wheel other than the first wheel and the second wheel in the wheels in which no flat tire occurs is the third wheel, where an action mode of the wheel torque distributed to the third wheel is driving.

With reference to the third aspect or the fourth aspect, in an optional implementation, there are two wheels in which a flat tire occurs, and the control unit is specifically configured to: determine a distribution order and an action mode of a wheel torque required for control based on a value of the additional yaw moment, positions of the wheels in which the flat tire occurs, and a vertical force of a wheel in which no flat tire occurs, where a value of the wheel torque required for control is a quotient obtained by dividing a product of the additional yaw moment and a wheel diameter by an average track of wheels; determine that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determine that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; and control, based on the distribution order and the action mode of the wheel torque required for control, the absolute value of the wheel torque distributed to the first wheel, and the absolute value of the wheel torque distributed to the second wheel, the wheels in which the flat tire occurs.

With reference to the third aspect or the fourth aspect, in an optional implementation, the control unit is further configured to: skip distributing the wheel torque to the second wheel when the absolute value of the wheel torque distributed to the first wheel is the absolute value of the wheel torque required for control; and control the wheel in which the flat tire occurs, based on the distribution order and the action mode of the wheel torque required for control and the absolute value of the wheel torque distributed to the first wheel.

With reference to the third aspect or the fourth aspect, in an optional implementation, the control unit is further configured to: when the additional yaw moment is less than zero, if both the wheels in which the flat tire occurs are wheels on a left side of a vehicle traveling direction, determine that, in the wheels in which no flat tire occurs, a wheel with a greater vertical force is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is braking; or if both the wheels in which the flat tire occurs are wheels on a right side of a vehicle traveling direction, determine that, in the wheels in which no flat tire occurs, a wheel with a greater vertical force is the first wheel, where an action mode of the wheel torque distributed to the first wheel is driving, and determine that a remaining wheel other than the first wheel in the wheels in which no flat tire occurs is the second wheel, where an action mode of the wheel torque distributed to the second wheel is driving; or if wheels in which the flat tire occurs are not wheels on a same side of a vehicle traveling direction, determine that a wheel on a right side of the vehicle traveling direction is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is driving.

With reference to the third aspect or the fourth aspect, in an optional implementation, the control unit is further configured to: when the additional yaw moment is greater than zero, if both the wheels in which the flat tire occurs are wheels on a left side of a vehicle traveling direction, determine that, in the wheels in which no flat tire occurs, a wheel with a greater vertical force is the first wheel, where an action mode of the wheel torque distributed to the first wheel is driving, and determine that a remaining wheel other than the first wheel in the wheels in which no flat tire occurs is the second wheel, where an action mode of the wheel torque distributed to the second wheel is driving; or if both the wheels in which the flat tire occurs are wheels on a right side of a vehicle traveling direction, determine that, in the wheels in which no flat tire occurs, a wheel with a greater vertical force is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is braking; or if wheels in which the flat tire occurs are not wheels on a same side of a vehicle traveling direction, determine that a wheel on a left side of the vehicle traveling direction is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is driving.

With reference to the third aspect or the fourth aspect, in an optional implementation, there are three wheels in which the flat tire occurs, and the control unit is further configured to: determine an action mode of a wheel torque required for control based on a value of the additional yaw moment and a position of a wheel in which no flat tire occurs, where a value of the wheel torque required for control is a quotient obtained by dividing a product of the additional yaw moment and a wheel diameter by an average track of wheels; determine that an absolute value of a wheel torque distributed to the wheel in which no flat tire occurs is a smaller value in an absolute value of the wheel torque required for control and a maximum road surface friction torque of the wheel in which no flat tire occurs; and control, based on the action mode of the wheel torque required for control and the absolute value of the wheel torque distributed to the wheel in which no flat tire occurs, the wheels in which the flat tire occurs.

With reference to the third aspect or the fourth aspect, in an optional implementation, the control unit is further configured to: when the additional yaw moment is less than zero, if the wheel in which no flat tire occurs is a wheel on a left side of a vehicle traveling direction, determine that an action mode of the wheel torque distributed to the wheel in which no flat tire occurs is driving, or if the wheel in which no flat tire occurs is a wheel on a right side of a vehicle traveling direction, determine that an action mode of the wheel torque distributed to the wheel in which no flat tire occurs is braking; or when the additional yaw moment is greater than zero, if the wheel in which no flat tire occurs is a wheel on a left side of a vehicle traveling direction, determine that an action mode of the wheel torque distributed to the wheel in which no flat tire occurs is braking, or if the wheel in which no flat tire occurs is a wheel on a right side of a vehicle traveling direction, determine that an action mode of the wheel torque distributed to the wheel in which no flat tire occurs is driving.

According to a fifth aspect, an embodiment of this application provides a vehicle control device, including a processor and a memory, where the processor and the memory are connected to each other, the memory is configured to store a program instruction, and the processor is configured to invoke the program instruction in the memory to perform the method described in any one of the first aspect or the possible implementations of the first aspect, or perform the method described in any one of the second aspect or the possible implementations of the second aspect.

According to a sixth aspect, an embodiment of this application provides a computer-readable storage medium, where the computer storage medium stores a program instruction, and when the program instruction is run by a processor, the processor performs the method described in any one of the first aspect or the possible implementations of the first aspect, or perform the method described in any one of the second aspect or the possible implementations of the second aspect.

According to a seventh aspect, an embodiment of this application provides a computer program. When the computer program is run on a processor, the processor performs the method described in any one of the first aspect or the possible implementations of the first aspect, or performs the method described in any one of the second aspect or the possible implementations of the second aspect.

In the embodiments of this application, the lateral force interference compensation torque is added to the additional yaw moment of the vehicle in which the flat tire occurs, so that the additional yaw moment more accurately represents the torque required for controlling the vehicle in which the flat tire occurs, and the feedback gain may be calculated based on the absolute value of the desired yaw angular acceleration, so that the problem of the delayed response of the yaw rate of the vehicle in which the flat tire occurs can be alleviated. Therefore, the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

BRIEF DESCRIPTION OF THE DRAWINGS

To describe the technical solutions in the embodiments of this application more clearly, the following briefly describes the accompanying drawings required for describing the embodiments or the prior art.

DETAILED DESCRIPTION OF ILLUSTRATIVE EMBODIMENTS

The following describes the technical solutions in the embodiments of this application with reference to the accompanying drawings.

Figure 1:
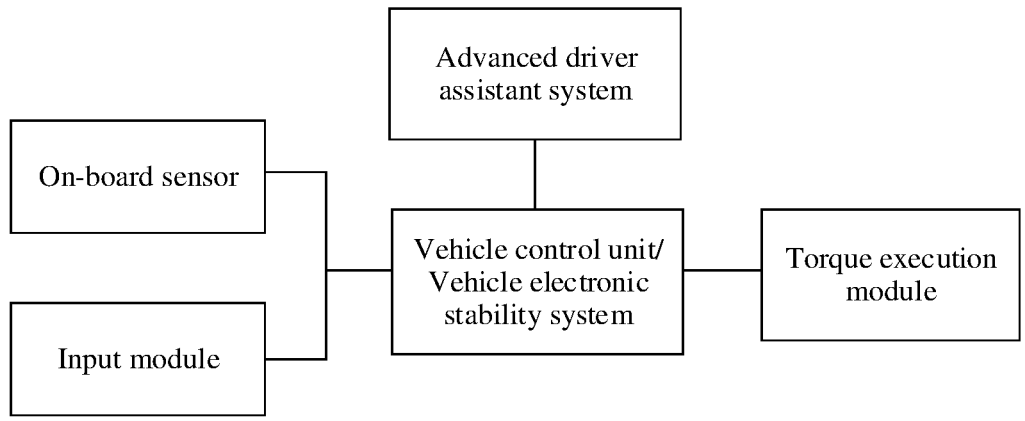
FIG. 1 is a schematic diagram of an architecture of a vehicle control system according to an embodiment of this application.

FIG. 1 is a schematic diagram of an architecture of a vehicle control system according to an embodiment of this application. The system includes devices such as an on-board sensor, an input module, an advanced driver assistant system (ADAS), a vehicle control unit (VCU), a vehicle electronic stability program (ESP), and a torque execution module. The following describes functions of the foregoing devices.

The on-board sensor collects status information of a vehicle. The status information of the vehicle includes information such as a longitudinal acceleration, a lateral acceleration, a yaw rate, tire pressures of four wheels, wheel speeds of the four wheels, and a suspension travel distance.

The input module may be used by a driver to input control information of the vehicle, for example, information such as a steering wheel angle, a driving gear, and driving and braking.

The advanced driver assistant system ADAS uses sensors such as cameras, radars, lasers, and ultrasonic waves to collect environment data inside and outside a vehicle, identifies static and dynamic objects, and senses a driver intention of the vehicle through technical processing such as detection and tracking.

The vehicle control unit VCU is a control unit for implementing vehicle control decision-making, and may determine a driver intention of a driver by collecting signals of an accelerator pedal, a gear, a brake pedal, a steering wheel angle, and the like. The VCU monitors information about a vehicle status (such as a vehicle speed and a temperature), sends a running status control instruction to a power system and a power battery system after determining and processing the information, and controls a working mode of an electronic control system of a vehicle accessory. The VCU has fault diagnosis, protection, and storage functions for an entire vehicle system.

The vehicle electronic stability system ESP may analyze vehicle travelling status information sent by a vehicle sensor, and then send a correction instruction to an anti-lock brake system (ABS), an electrical brake distribution (EBD), and the like, to help the vehicle maintain a dynamic balance. An effect is more obvious in a case of oversteering or understeering.

The torque execution module may receive a wheel torque requirement from the VCU, and apply a braking or driving torque to a wheel, to implement vehicle stability control.

A vehicle control device in this embodiment of this application may be the vehicle control unit VCU, or may be an independent controller added to the vehicle control system, or may be the vehicle electronic stability program ESP. The vehicle device identifies a tire in which a flat tire occurs, calculates a control value, and then converts the control value into a braking or driving torque of a wheel, so that the vehicle travels based on the driver intention. Specifically, when the vehicle is driven by the driver, the driver intention of the vehicle may be determined by collecting signals of an accelerator pedal, a gear, a brake pedal, a steering wheel angle, and the like. When the vehicle is self-driving, the advanced driver assistant system controls travelling of the vehicle, and analyzes and calculates the driver intention of the vehicle.

Figure 2:
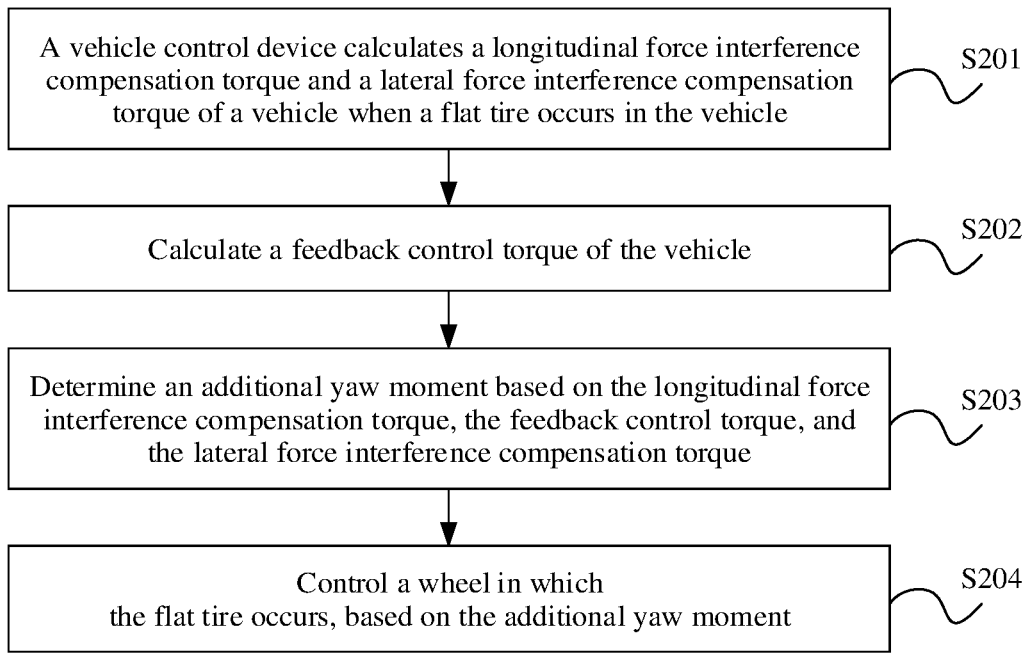
FIG. 2 is a flowchart of a vehicle control method according to an embodiment of this application.

FIG. 2 is a flowchart of a vehicle control method according to an embodiment of this application. The method may be implemented based on the architecture shown in FIG. 1. A vehicle control device described below may be the vehicle control unit VCU shown in FIG. 1, or may be an independent controller added to the vehicle control system shown in FIG. 1, or may be a vehicle electronic stability program ESP. The method includes but is not limited to the following steps.

S201. The vehicle control device calculates a longitudinal force interference compensation torque and a lateral force interference compensation torque of a vehicle when a flat tire occurs in the vehicle.

Specifically, before the vehicle control device calculates the longitudinal force interference compensation torque and the lateral force interference compensation torque, the vehicle control device determines a wheel in which the flat tire occurs.

The following describes a manner of determining, by the vehicle control device, the wheel in which the flat tire occurs. Specifically, the vehicle control device identifies and marks the wheel in which the flat tire occurs by using a threshold determining method based on a tire pressure, a wheel speed, and a deviation of a desired yaw rate from an actual value. The manner of determining the wheel in which the flat tire occurs includes but is not limited to the following steps.

(1) Detect whether a tire pressure $p_i$ is lower than a normal tire pressure threshold $p_{th}$, and if $p_i < p_{th}$, set a tire pressure abnormality flag $p_{i\_flag}$ of the wheel to 1.

$p_{th}$ is a preset value, and may be obtained through calibration. For tires of different types or brands, $p_{th}$ may have different values. i=1 represents a left front wheel along a vehicle traveling direction. i=2 represents a right front wheel along the vehicle traveling direction. i=3 represents a left rear wheel along the vehicle traveling direction. i=4 represents a right rear wheel along the vehicle traveling direction. For example, if $p_1 < p_{th}$, a tire pressure abnormality flag $p_{1\_flag}$ of the wheel is set to 1, indicating that the tire pressure of the left front wheel along the vehicle traveling direction is lower than the normal tire pressure threshold $p_{th}$, and the tire pressure abnormality flag $p_{1\_flag}$ of the left front wheel along the vehicle traveling direction is set to 1. In other formulas in this application document, values of the subscript i are all the foregoing meanings, and are used to distinguish four tires at different positions in the vehicle. The meanings of the subscript i in other formulas in this application document are not described in detail again.

(2) Detect a wheel speed $\omega_i$ of a tire with an abnormal tire pressure, detect whether the wheel speed of the tire with the abnormal tire pressure exceeds an average wheel speed of the other three wheels, and if the wheel speed of the tire with the abnormal tire pressure exceeds the average wheel speed of the other three wheels, set a wheel speed abnormality flag $\omega_{flag}$ of the tire with the abnormal tire pressure to 1.

The manner of detecting whether the wheel speed of the tire with the abnormal tire pressure exceeds an average wheel speed of the other three wheels may be shown by formula 1-1:

$$\omega_i - \tfrac{1}{3}\Sigma_{j=1, j \neq i}^{4} \omega_j > \omega_{th} \qquad 1\text{-}1$$

$\Delta\omega_{th}$ is a wheel speed difference threshold, is a preset value, and may be obtained through calibration. If the formula 1-1 is satisfied, it indicates that the wheel speed of the tire with the abnormal tire pressure exceeds the average wheel speed of the other three wheels, and the wheel speed abnormality flag $\omega_{flag}$ of the tire with the abnormal tire pressure is set to 1.

(3) Detect whether an actual yaw rate γ of the vehicle is close to a desired yaw rate yd. If the actual yaw rate exceeds a threshold, a yaw rate abnormality flag $\gamma_{i\_flag}$ is set to 1.

First, a method for calculating the desired yaw rate $\gamma^d$ is described.

The desired yaw rate can represent a vehicle traveling track desired by a driver, and is mainly calculated based on a steering wheel input of the driver, a vehicle speed, and a road surface restriction. Parameters used for calculation are parameters of a vehicle in which no flat tire occurs. Formula 1-2 may be used for calculation. Formula 1-2 is:

$$\gamma^d = \begin{cases} \dfrac{\gamma_s}{1+\tau_s}, & \text{if } |\gamma_s| < \dfrac{\mu g}{v_x} \\ \dfrac{\mu g}{v_x}\operatorname{sign}(\gamma_s), & \text{otherwise} \end{cases} \qquad 1\text{-}2$$

$$\gamma_s = \dfrac{v_x \delta}{l + \dfrac{mv_x^2(l_r C_r - l_f C_f)}{2 l C_f C_r}},$$

and calculation is performed based on a steady-state response of a linear two-free vehicle model. τ is a time constant, and is obtained through calibration. δ is a wheel steering angle. $v_x$ is a longitudinal vehicle speed. m is vehicle quality. $C_{f,r}$ are cornering stiffnesses of front and rear wheels of the vehicle in which no flat tire occurs. l is a distance between front and rear axles. $l_{f,r}$ are distances respectively from the front and rear axles to a centroid. μ is a road surface attachment coefficient. g is a gravity acceleration.

The manner of detecting whether the actual yaw rate γ of the vehicle is close to the desired yaw rate $\gamma^d$ may be shown by formulas 1-3:

$$|\gamma - \gamma^d| > \Delta\gamma_{th} \qquad 1\text{-}3$$

$\Delta\gamma_{th}$ is a yaw rate deviation threshold, is a preset value, and may be obtained through calibration.

(4) If each of the tire pressure abnormality flag $p_{i\_flag}$, the wheel speed abnormality flag $\omega_{i\_flag}$, and the yaw rate abnormality flag $\gamma_{i\_flag}$ is 1, and the vehicle speed exceeds 30 km/h, set a flat tire flag $\text{Tire}_{i\_flag}$ to 1, and determine that the wheel in which the flat tire occurs is i.

It should be noted that there may be another method for determining the wheel in which the flat tire occurs. The method for determining a wheel in which the flat tire occurs is not limited herein. For example, in another method, step (1), step (2), and step (3) are the same as step (1), step (2), and step (3) in the foregoing method, and step (4) is as follows: If each of the tire pressure abnormality flag $p_{i\_flag}$, the wheel speed abnormality flag $\omega_{i\_flag}$, and the yaw rate abnormality flag $\gamma_{i\_flag}$ is 1, set a flat tire flag $\text{Tire}_{i\_flag}$ to 1, and determine that the wheel in which the flat tire occurs is i. For another example, in another method, step (1) and step (2) are the same as step (1) and step (2) in the foregoing method, and step (3) is as follows: If each of the tire pressure abnormality flag $p_{i\_flag}$ and the wheel speed abnormality flag $\omega_{i\_flag}$ is 1, and the vehicle speed exceeds 30 km/h, set a flat tire flag $\text{Tire}_{i\_flag}$ to 1, and determine that the wheel in which the flat tire occurs is i.

After the vehicle control device determines the wheel in which the flat tire occurs, the vehicle control device calculates the longitudinal force interference compensation torque and the lateral force interference compensation torque of the vehicle. The following first describes a method for calculating the longitudinal force interference compensation torque of the vehicle.

A yaw motion equation of the vehicle is shown in formula 2-1:

$$I_z \dot{\gamma} = l_f(F_{y1}+F_{y2}) - l_r(F_{y3}+F_{y4}) + \frac{b}{2}(-F_{x1}+F_{x2}-F_{x3}+F_{x4}) \quad 2\text{-}1$$

$I_z$ is a rotational inertia of the vehicle around a Z-axis, $\dot{\gamma}$ is a yaw angular acceleration, $F_{yi}$ is a wheel lateral force, $F_{xi}$ is a wheel longitudinal force, b is an average track, and $l_{f,r}$ are the distances respectively from the front and rear axles to the centroid.

A manner of calculating the wheel longitudinal force is shown in formula 2-2:

$$F_{xi} = \frac{T_i}{R} - \frac{T_{r\omega i}}{R} \quad 2\text{-}2$$

$T_i$ is a wheel torque, and an action mode of the wheel torque may be driving or braking. When the wheel torque is a driving torque, $T_i>0$. When the wheel torque is the braking torque, $T_i<0$. $T_{r\omega i}$ is a rolling resistance torque of the wheel, and R is a wheel radius.

Figure 3:
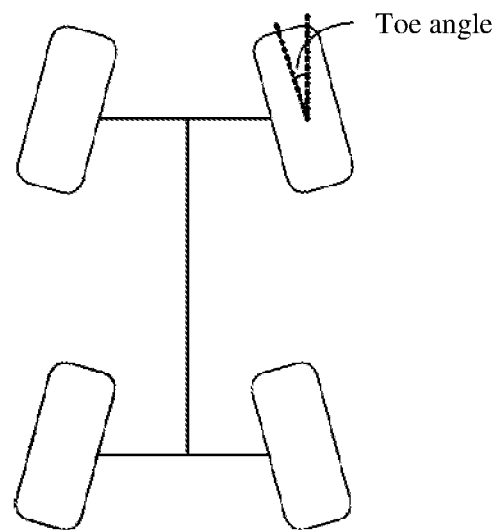
FIG. 3 is a schematic diagram of a normal vehicle affected by a toe angle according to an embodiment of this application.

The wheel lateral force is affected by a toe angle. There may be two cases for the toe angle: "toe in" and "toe out". "Toe in" is used as an example. FIG. 3 is a schematic diagram of a normal vehicle affected by a toe angle according to an embodiment of this application. When the vehicle travels straight, toe angles of a wheel on a left side and a wheel on a right side that are along a vehicle traveling direction are equal and are in opposite directions. When the vehicle turns, a slip angle of the wheel is obtained through addition on this basis.

Because the flat tire causes a change in a suspension travel distance, the toe angles of the wheels change. The toe angles of the four wheels are denoted as $\theta_i$, and slip angles $\alpha_i$ of the four wheels may be obtained. A formula for calculating the slip angles $\alpha_i$ of the four wheels is shown in 2-3.

$$\alpha_1 = \delta - \theta_1 - \beta - \frac{l_f \gamma}{v_x}$$
$$\alpha_2 = \delta + \theta_2 - \beta - \frac{l_f \gamma}{v_x} \quad 2\text{-}3$$
$$\alpha_3 = -\theta_3 - \beta - \frac{l_f \gamma}{v_x}$$
$$\alpha_4 = \theta_4 - \beta + \frac{l_f \gamma}{v_x}$$

$\delta$ is the wheel steering angle, $\beta$ is a centroid slip angle, $v_x$ is the longitudinal vehicle speed, and $\gamma$ is the yaw rate.

Calculation of a tire lateral force $F_{yi}$ is shown in formula 2-4:

$$F_{yi}=C_i\alpha_i \quad 2\text{-}4$$

$C_i$ is a cornering stiffness of each wheel, and a yaw motion equation may be obtained by substituting formula 2-3 and formula 2-4 into formula 2-1, as shown in formula 2-5:

$$I_z\dot{\gamma} = l_f(C_1+C_2)\left(\delta-\beta-\frac{l_f\gamma}{v_x}\right) - l_r(C_3+C_4)\left(-\beta+\frac{l_f\gamma}{v_x}\right)+\frac{b}{2R}\Delta T + \quad 2\text{-}5$$

-continued
$$\frac{b}{2}\left(\frac{T_{r\omega 1}}{R}-\frac{T_{r\omega 2}}{R}+\frac{T_{r\omega 3}}{R}-\frac{T_{r\omega 4}}{R}\right)+(l_f(C_2\theta_2-C_1\theta_1)+l_r(C_3\theta_3-C_4\theta_4))$$

$\Delta T = -T_1+T_2-T_3+T_4$, and $\Delta T$ is a wheel torque difference of the four wheels, may be applied by a motor or hydraulic pressure, and is a control value. Last two items in the formula are interference items. When the vehicle is travelling properly, values of the last two items are o. However, for the wheel in which the flat tire occurs, a rolling resistance coefficient increases, the cornering stiffness decreases, and the toe angle changes. As a result, the interference items are large and need to be compensated. For example, a flat tire occurs in a left front wheel in the vehicle traveling direction. Because the rolling resistance coefficient increases, a manner of calculating a yaw moment $\Delta M_{dx}$ generated by the longitudinal force is shown in formula 2-6:

$$\Delta M_{dx} = \frac{b}{2}\left(\frac{T_{r\omega 1}}{R} - \frac{T_{r\omega 2}}{R}\right) \quad 2\text{-}6$$

It should be noted that, if a flat tire occurs in a right front wheel in the vehicle traveling direction, a manner of calculating the yaw moment $\Delta M_{dx}$ generated by the longitudinal force is the same as that in formula 2-6. If a flat tire occurs in a left rear wheel or a right rear wheel in the vehicle traveling direction, a manner of calculating the yaw moment $\Delta M_{dx}$ generated by the longitudinal force is shown in formula 2-7:

$$\Delta M_{dx} = \frac{b}{2}\left(\frac{T_{r\omega 3}}{R} - \frac{T_{r\omega 4}}{R}\right) \quad 2\text{-}7$$

In addition, if there are two or three wheels in which a flat tire occurs, yaw moments generated by longitudinal forces of both or all the wheels in which a flat tire occurs are added to obtain the yaw moment $\Delta M_{dx}$ generated by the longitudinal forces of the wheels in which a flat tire occurs.

The yaw moment is considered to be compensated for vehicle control after the flat tire to quickly reduce a yaw degree of the vehicle. For example, a flat tire occurs in a left front wheel in the vehicle traveling direction, and impact of a rolling resistance of a wheel in which no flat tire occurs is ignored, and a manner of calculating the longitudinal force interference compensation torque is shown in formula 2-8:

$$\Delta M_{fx} = -\Delta M_{dx} \approx -\frac{b}{2}\frac{T_{r\omega 1}}{R} = -\frac{b}{2}k_{roll}F_{z1} \quad 2\text{-}8$$

$k_{roll}$ is a rolling resistance coefficient obtained in a flat tire experiment, and $F_{z1}$ is a vertical force of the left front wheel in the vehicle traveling direction. For example, according to the flat tire experiment, if the rolling resistance coefficient increases by approximately 20 times, a value of $k_{roll}$ may be 20. It should be noted that, in a manner of calculating the longitudinal force interference compensation torque, $k_{roll}$ is multiplied by the vertical force $F_{zi}$ of the wheel in which the flat tire occurs. If i of the wheel in which the flat tire occurs is equal to 2, the manner of calculating the longitudinal force interference compensation torque is shown in formula 2-9:

$$\Delta M_{fx} = -\Delta M_{dx} \approx \frac{b}{2}\frac{T_{rw2}}{R} = -\frac{b}{2}k_{roll}F_{z2} \qquad 2\text{-}9$$

Next, a method for calculating the lateral force interference compensation torque of the vehicle is described.

A manner of calculating a yaw moment generated by the lateral force is shown in formula 2-10:

$$\Delta M_{dy} = l_f(C_2\theta_2 - C_1\theta_1) + l_r(C_3\theta_3 - C_4\theta_4) \qquad 2\text{-}10$$

For example, a flat tire occurs in a left front wheel in the vehicle traveling direction. In this case, the manner of calculating the lateral force interference compensation torque is shown in formula 2-11:

$$\Delta M_{fy} = -\Delta M_{dy} = -l_f(C_f\theta_2 - k_y C_f\theta_1) - l_r(C_r\theta_3 - C_r\theta_4) \qquad 2\text{-}11$$

$k_y$ is a ratio of a tire cornering stiffness obtained in a flat tire experiment to that of a normal tire, and $C_{f,r}$ are cornering stiffnesses of front and rear wheels of a vehicle in which no flat tire occurs. For example, the ratio of the tire cornering stiffness obtained in the flat tire experiment to that of the normal tire is approximately 25%, and a value of $k_y$ may be 0.25. It should be noted that, in a manner of calculating the lateral force interference compensation torque, $k_y$ is multiplied by the toe angle $\theta_L$ of the wheel in which the flat tire occurs. If i of the wheel in which the flat tire occurs is equal to 2, the manner of calculating the lateral force interference compensation torque is shown in formula 2-12:

$$\Delta M_{fy} = -\Delta M_{dy} = -l_f(k_y C_f\theta_2 - C_f\theta_1) - l_r(C_r\theta_3 - C_r\theta_4) \qquad 2\text{-}12$$

S202. Calculate a feedback control torque of the vehicle.

To track and adjust the yaw rate in the travelling process of the vehicle, feedback control needs to be added to the vehicle control. The feedback control is mainly completed by a proportional-integral controller (PI controller). $K_{P0}(v_x)$ and $K_{I0}(v_x)$ are feedback gains of the PI controller. The two values are values related to a longitudinal vehicle speed of a vehicle, and may be calibrated by using parameters of a vehicle in which no flat tire occurs.

After the feedback gains $K_{P0}(v_x)$ and $K_{I0}(v_x)$ of the PI controller are obtained, the vehicle control device calculates the feedback control torque based on the feedback gains.

Specifically, a manner of calculating the feedback control torque based on adjusted feedback gains is shown in formula 3-1:

$$\Delta M_{fb} = K_{P0}(v_x)(\gamma^d - \gamma) + K_{I0}(v_x)\int_{t_0}^{t}(\gamma^d - \gamma) \qquad 3\text{-}1$$

S203. Determine an additional yaw moment based on the longitudinal force interference compensation torque, the lateral force interference compensation torque, and the feedback control torque.

Specifically, a manner of calculating the required additional yaw moment $\Delta M$ based on the longitudinal force interference compensation torque $\Delta M_{fx}$, the lateral force interference compensation torque $\Delta M_{fy}$, and the feedback control torque $\Delta M_{fb}$ is shown in formula 4-1:

$$\Delta M = \Delta M_{fx} + \Delta M_{fb} + \Delta M_{fy} \qquad 4\text{-}1$$

S204. Control the wheel in which the flat tire occurs, based on the additional yaw moment.

Specifically, a manner of controlling the wheel in which the flat tire occurs, based on the additional yaw moment is as follows: First, a distribution order and an action mode of a wheel torque required for control are determined based on a distribution principle. Then, values of wheel torques distributed to wheels in which no flat tire occurs are determined. Then, the wheel torques are sequentially applied to the wheels in which no flat tire occurs based on the distribution order by using the values of the distributed wheel torques and the action mode.

The distribution principle is as follows: (1) No control is imposed on the wheel in which the flat tire occurs. (2) After the flat tire occurs, the vehicle should be controlled to slow down as soon as possible. Therefore, priority is given to wheel braking. (3) Due to the flat tire, a vertical force of the wheel in which the flat tire occurs and a wheel diagonal to the wheel in which the flat tire occurs decreases, and a vertical force of the other two wheels diagonal to each other increases. Therefore, priority is given to the vertical force.

The following describes in detail the manner of controlling the wheel in which the flat tire occurs, based on the additional yaw moment in three cases in which there is one wheel in which the flat tire occurs, there are two wheels in which the flat tire occurs, and there are three wheels in which the flat tire occurs.

When there is one wheel in which the flat tire occurs, the manner of controlling the wheel in which the flat tire occurs, based on the additional yaw moment includes but is not limited to the following steps.

(1) Determine a distribution order and an action mode of a wheel torque required for control based on a value of the additional yaw moment, a position of the wheel in which the flat tire occurs, and the vertical force of the wheels in which no flat tire occurs.

Specifically, a value of the wheel torque required for control is a quotient obtained by dividing a product of the additional yaw moment and a wheel diameter by an average track of the wheels. That is, a manner of calculating the value of the wheel torque T required for control is shown in formula 5-1:

$$T = \left|\Delta M \cdot \frac{2R}{b}\right| \qquad 5\text{-}1$$

$\Delta M$ is the additional yaw moment, R is a wheel radius, and b is the average track of the four wheels.

Specifically, there are at least two cases for the method for determining a distribution order and an action mode of a wheel torque required for control based on a value of the additional yaw moment, a position of the wheel in which the flat tire occurs, and the vertical force of the wheels in which no flat tire occurs. The following describes the two cases.

In a first case, the additional yaw moment is less than zero. It is determined that, in the wheels in which no flat tire occurs, a wheel with a greater vertical force in wheels on a right side of a vehicle traveling direction is the first wheel, where an action mode of the wheel torque distributed to the first wheel is braking. That the additional yaw moment is less than zero indicates that the required additional yaw moment is clockwise.

Figure 4A:
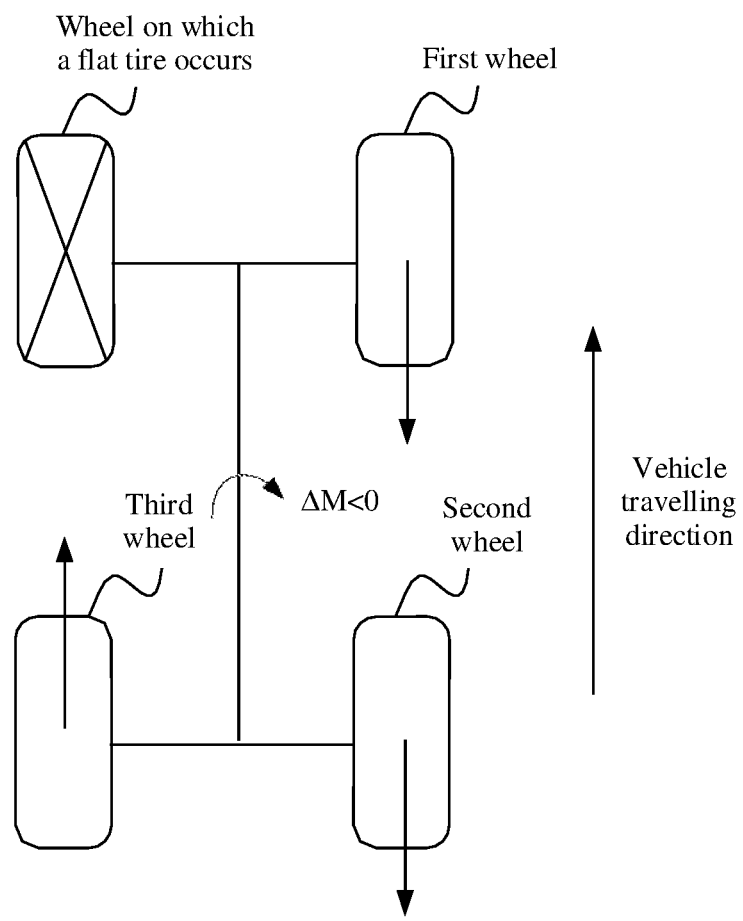
FIG. 4A is a schematic diagram of a distribution order and an action mode of a wheel torque required for control according to an embodiment of this application.

If in the wheels in which no flat tire occurs, there are two wheels on the right side of the vehicle traveling direction, it is determined that a wheel other than the first wheel in the wheels on the right side of the vehicle traveling direction is the second wheel, where an action mode of the wheel torque distributed to the second wheel is braking, and it is determined that a remaining wheel other than the first wheel and the second wheel in the wheels in which no flat tire occurs is the third wheel, where an action mode of the wheel torque distributed to the third wheel is driving. FIG. 4A is a schematic diagram of a distribution order and an action mode of a wheel torque required for control according to an embodiment of this application. In the figure, an upward arrow indicates driving, and a downward arrow indicates braking.

Figure 4B:
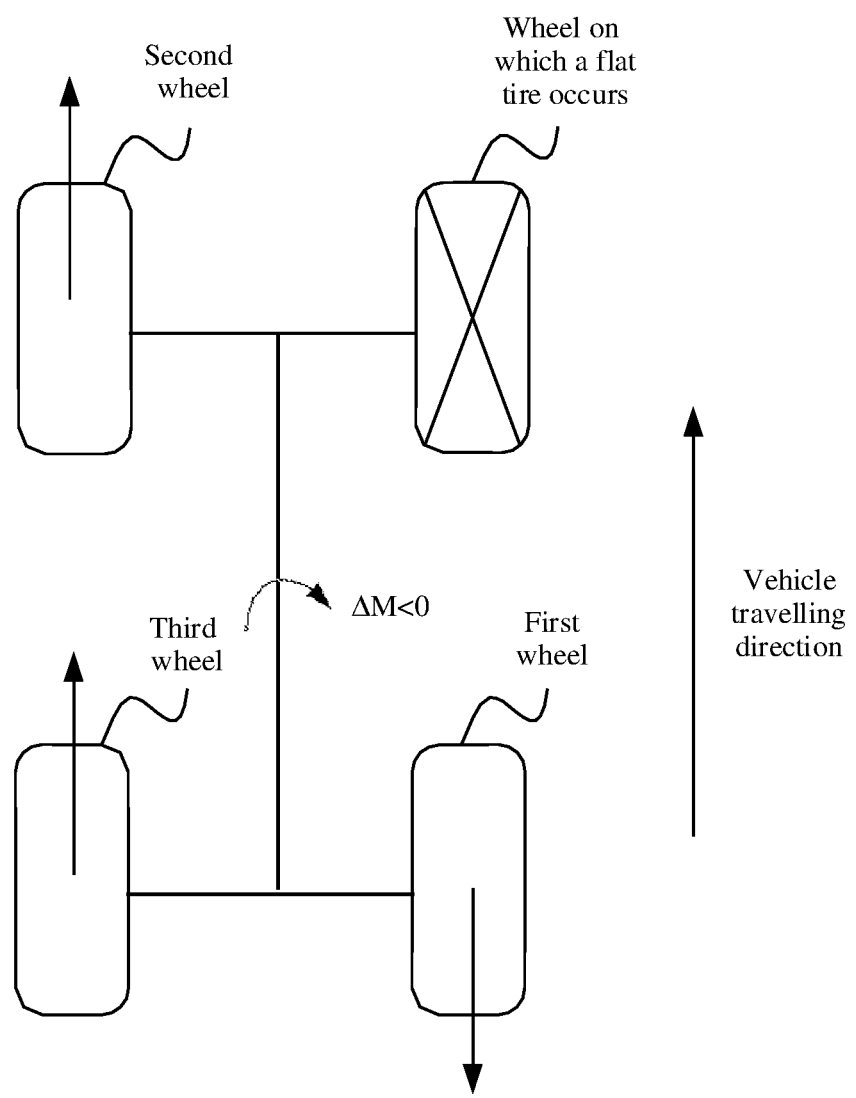
FIG. 4B is a schematic diagram of a distribution order and an action mode of another wheel torque required for control according to an embodiment of this application.

If in the wheels in which no flat tire occurs, there is one wheel on the right side of the vehicle traveling direction, it is determined that, in the wheels in which no flat tire occurs, a wheel that is diagonal to the first wheel is the second wheel, where an action mode of the wheel torque distributed to the second wheel is driving, and it is determined that a remaining wheel other than the first wheel and the second wheel in the wheels in which no flat tire occurs is the third wheel, where an action mode of the wheel torque distributed to the third wheel is driving. FIG. 4B is a schematic diagram of a distribution order and an action mode of another wheel torque required for control according to an embodiment of this application.

In a second case, the additional yaw moment is greater than zero. It is determined that, in the wheels in which no flat tire occurs, a wheel with a greater vertical force in wheels on a left side of a vehicle traveling direction is the first wheel, where an action mode of the wheel torque distributed to the first wheel is braking. That the additional yaw moment is greater than zero indicates that the required additional yaw moment is counterclockwise.

Figure 5A:
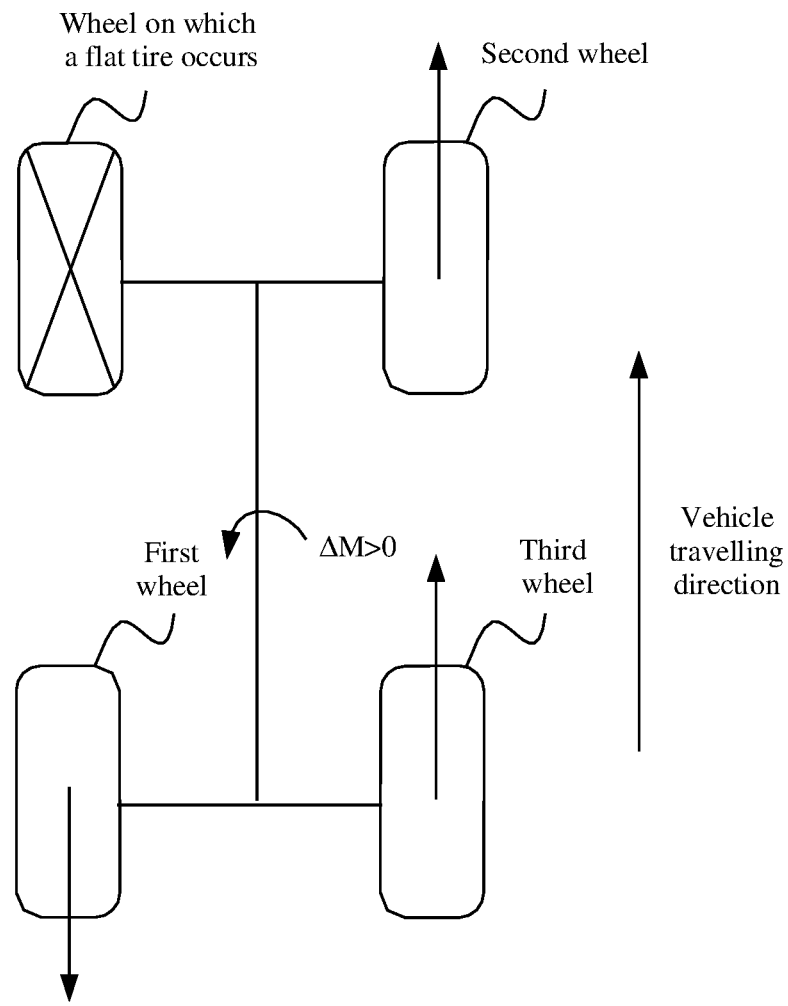
FIG. 5A is a schematic diagram of a distribution order and an action mode of another wheel torque required for control according to an embodiment of this application.

If in the wheels in which no flat tire occurs, there are two wheels on the left side of the vehicle traveling direction, it is determined that a wheel other than the first wheel in the wheels on the left side of the vehicle traveling direction is the second wheel, where an action mode of the wheel torque distributed to the second wheel is braking, and it is determined that a remaining wheel other than the first wheel and the second wheel in the wheels in which no flat tire occurs is the third wheel, where an action mode of the wheel torque distributed to the third wheel is driving. FIG. 5A is a schematic diagram of a distribution order and an action mode of another wheel torque required for control according to an embodiment of this application.

Figure 5B:
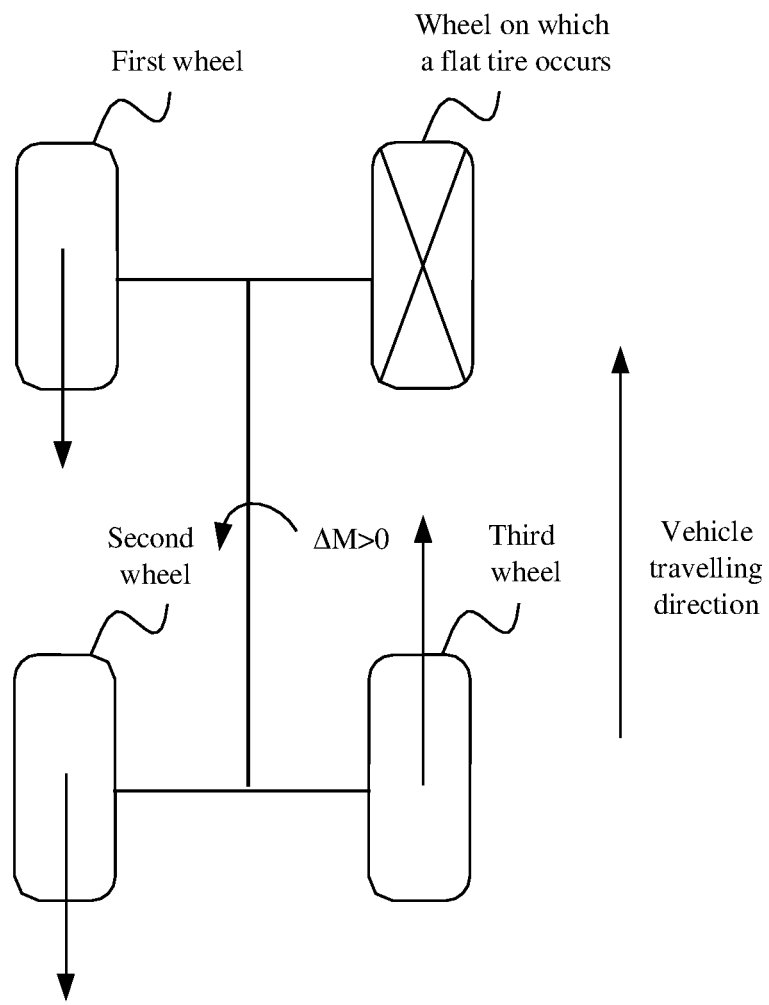
FIG. 5B is a schematic diagram of a distribution order and an action mode of another wheel torque required for control according to an embodiment of this application.

If in the wheels in which no flat tire occurs, there is one wheel on the left side of the vehicle traveling direction, it is determined that, in the wheels in which no flat tire occurs, a wheel that is diagonal to the first wheel is the second wheel, where an action mode of the wheel torque distributed to the second wheel is driving, and it is determined that a remaining wheel other than the first wheel and the second wheel in the wheels in which no flat tire occurs is the third wheel, where an action mode of the wheel torque distributed to the third wheel is driving. FIG. 5B is a schematic diagram of a distribution order and an action mode of another wheel torque required for control according to an embodiment of this application.

(2) Determine values of wheel torques distributed to the wheels in which no flat tire occurs, and sequentially apply the wheel torques to the wheels in which no flat tire occurs by using the values of the distributed wheel torques and the action mode.

Specifically, there may be at least three manners of determining values of wheel torques distributed to the wheels in which no flat tire occurs, and sequentially applying the wheel torques to the wheels in which no flat tire occurs by using the values of the distributed wheel torques and the action mode. The following describes the three manners.

In a first manner, it is determined that an absolute value of a wheel torque distributed to a first wheel in the distribution order is a smaller value in an absolute value of the wheel torque required for control and a maximum road surface friction torque of the first wheel. An expression of the absolute value $|T_x|$ of the wheel torque distributed to the first wheel is shown in formula 5-2:

$$|T_x| = \min(|T|, \mu F_{zx} R) \qquad 5\text{-}2$$

$\mu F_{zx} R$ is the maximum road surface friction torque of the first wheel, Fx is a vertical force exerted on the first wheel, p is a ground attachment coefficient, and R is a wheel radius.

When the absolute value of the wheel torque distributed to the first wheel is the maximum road surface friction torque $\mu F_{zx} R$ of the first wheel, it is determined that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel. An expression of the absolute value $|T_y|$ of the wheel torque distributed to the second wheel is shown in formula 5-3:

$$|T_y| = \min(||T| - |T_x||, \rho F_{zy} R) \qquad 5\text{-}3$$

$\mu F_{zx} R$ is the maximum road surface friction torque of the first wheel, $F_{zx}$ is a vertical force exerted on the first wheel, p is a ground attachment coefficient, and R is a wheel radius.

When the absolute value of the wheel torque distributed to the second wheel is the maximum road surface friction torque $\mu F_{zy} R$ of the second wheel, it is determined that an absolute value of a wheel torque distributed to a third wheel in the distribution order is a smaller value in a maximum road surface friction torque of the third wheel and an absolute value of a difference between the maximum road surface friction torque of the second wheel and the difference between the absolute value of the wheel torque required for control and the maximum road surface friction torque of the first wheel. An expression of the absolute value $|T_z|$ of the wheel torque distributed to the third wheel is shown in formula 5-4:

$$|T_z| = \min(||T| - |T_x| - |T_y||, \mu F_{zz} R) \qquad 5\text{-}4$$

$\mu F_{zz} R$ is the maximum road surface friction torque of the third wheel, $F_{zz}$ is a vertical force exerted on the third wheel, μ is a ground attachment coefficient, and R is a wheel radius.

Then, the wheel in which the flat tire occurs is controlled based on the distribution order and the action mode of the wheel torque required for control, the absolute value of the wheel torque distributed to the first wheel, the absolute value of the wheel torque distributed to the second wheel, and the absolute value of the wheel torque distributed to the third wheel. The following describes a specific manner of controlling, in this case, the wheel in which the flat tire occurs.

First, the wheel torque is applied to the first wheel based on the action mode of the wheel torque of the first wheel by using the absolute value of the wheel torque distributed to the first wheel as a value of the torque. Then, the wheel torque is applied to the second wheel based on the action mode of the wheel torque of the second wheel by using the absolute value of the wheel torque distributed to the second wheel as a value of the torque. Then, the wheel torque is applied to the third wheel based on the action mode of the wheel torque of the third wheel by using the absolute value of the wheel torque distributed to the third wheel as a value of the torque. In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In a second manner, a method for determining the absolute value of the wheel torque distributed to the first wheel in the distribution order is the same as that in the first manner. After the determining that an absolute value of a wheel torque distributed to a first wheel in the distribution order is a smaller value in an absolute value of the wheel torque required for control and a maximum road surface friction torque of the first wheel, the method further includes: skipping distributing the wheel torques to the second wheel and the third wheel when the absolute value of the wheel torque distributed to the first wheel is the absolute value of the wheel torque required for control. This case indicates that the yaw moment generated by the flat tire can be compensated by applying the wheel torque to the first tire.

Then, the wheel in which the flat tire occurs is controlled based on the distribution order and the action mode of the wheel torque required for control and the absolute value of the wheel torque distributed to the first wheel. The following describes a specific manner of controlling, in this case, the wheel in which the flat tire occurs.

The wheel torque is applied to the first wheel based on the action mode of the wheel torque of the first wheel by using the absolute value of the wheel torque distributed to the first wheel as a value of the torque. In this manner, the vehicle can quickly compensate for the yaw moment generated by the flat tire, and the vehicle runs more stably in a process of compensating for the yaw moment generated by the flat tire.

In a third manner, a method for determining the absolute values of the wheel torques distributed to the first wheel and the second wheel in the distribution order is the same as that in the first manner. After the determining that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel, the method further includes: skipping distributing the wheel torque to the third wheel when the absolute value of the wheel torque distributed to the second wheel is the absolute value of the difference between the absolute value of the wheel torque required for control and the maximum road surface friction torque of the first wheel. This case indicates that the yaw moment generated by the flat tire can be compensated by applying the wheel torques to the first wheel and the second wheel.

Then, the wheel in which the flat tire occurs is controlled based on the distribution order and the action mode of the wheel torque required for control, the absolute value of the wheel torque distributed to the first wheel, and the absolute value of the wheel torque distributed to the second wheel. First, the wheel torque is applied to the first wheel based on the action mode of the wheel torque of the first wheel by using the absolute value of the wheel torque distributed to the first wheel as a value of the torque. Then, the wheel torque is applied to the second wheel based on the action mode of the wheel torque of the second wheel by using the absolute value of the wheel torque distributed to the second wheel as a value of the torque. In this manner, the first wheel and the second wheel may be sequentially driven or braked in the distribution order, so that the vehicle can quickly compensate for the yaw moment generated by the flat tire, and the vehicle runs more stably in a process of compensating for the yaw moment generated by the flat tire.

When there are two wheels in which the flat tire occurs, the manner of controlling, based on the additional yaw moment, the wheels in which the flat tire occurs includes but is not limited to the following steps.

(1) Determine a distribution order and an action mode of a wheel torque required for control based on a value of the additional yaw moment, positions of the wheels in which the flat tire occurs, and vertical forces of wheels in which no flat tire occurs.

A value of the wheel torque required for control is a quotient obtained by dividing a product of the additional yaw moment and a wheel diameter by an average track of the wheels.

Specifically, there are at least two cases for the method for determining a distribution order and an action mode of a wheel torque required for control based on a value of the additional yaw moment, positions of the wheels in which the flat tire occurs, and vertical force of wheels in which no flat tire occurs. The following describes the two cases.

Figure 6A:
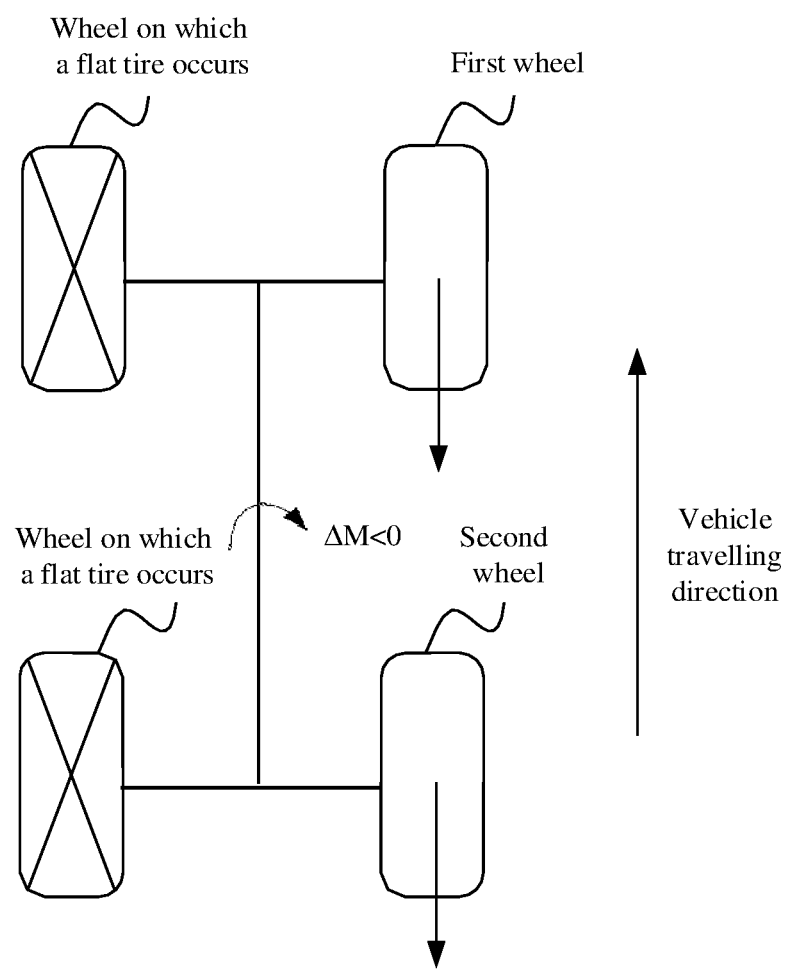
FIG. 6A is a schematic diagram of a distribution order and an action mode of another wheel torque required for control according to an embodiment of this application.

In a first case, the additional yaw moment is less than zero. If both the wheels in which the flat tire occurs are wheels on a left side of a vehicle traveling direction, it is determined that, in the wheels in which no flat tire occurs, a wheel with a greater vertical force is a first wheel, where an action mode of the wheel torque distributed to the first wheel is braking, and it is determined that a remaining wheel other than the first wheel in the wheels in which no flat tire occurs is the second wheel, where an action mode of the wheel torque distributed to the second wheel is braking. FIG. 6A is a schematic diagram of a distribution order and an action mode of another wheel torque required for control according to an embodiment of this application. The vertical force of the first wheel is greater than a vertical force of the second wheel. In addition, if vertical forces of the two wheels in which no flat tire occurs are equal, either of the two wheels is selected as the first wheel, and the other remaining wheel in which no flat tire occurs is the second wheel.

Figure 6B:
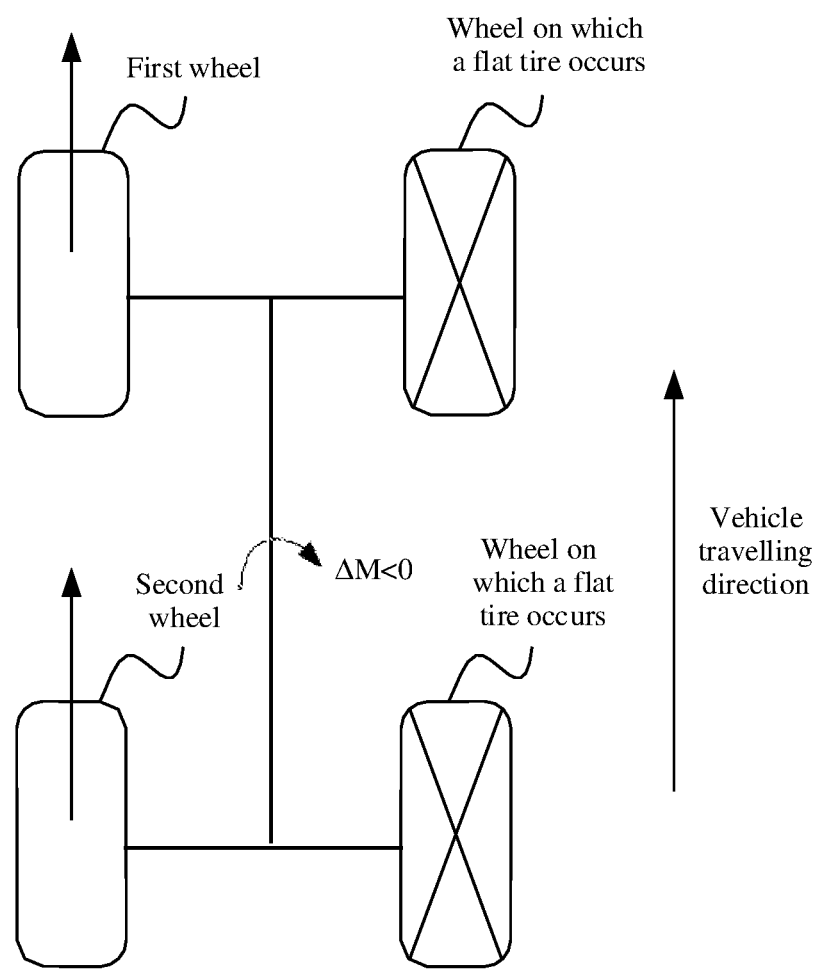
FIG. 6B is a schematic diagram of a distribution order and an action mode of another wheel torque required for control according to an embodiment of this application.

If both the wheels in which the flat tire occurs are wheels on a right side of a vehicle traveling direction, it is determined that, in the wheels in which no flat tire occurs, a wheel with a greater vertical force is a first wheel, where an action mode of the wheel torque distributed to the first wheel is driving, and it is determined that a remaining wheel other than the first wheel in the wheels in which no flat tire occurs is the second wheel, where an action mode of the wheel torque distributed to the second wheel is driving. FIG. 6B is a schematic diagram of a distribution order and an action mode of another wheel torque required for control according to an embodiment of this application. The vertical force of the first wheel is greater than a vertical force of the second wheel. In addition, if vertical forces of the two wheels in which no flat tire occurs are equal, either of the two wheels is selected as the first wheel, and the other remaining wheel in which no flat tire occurs is the second wheel.

Figure 6C:
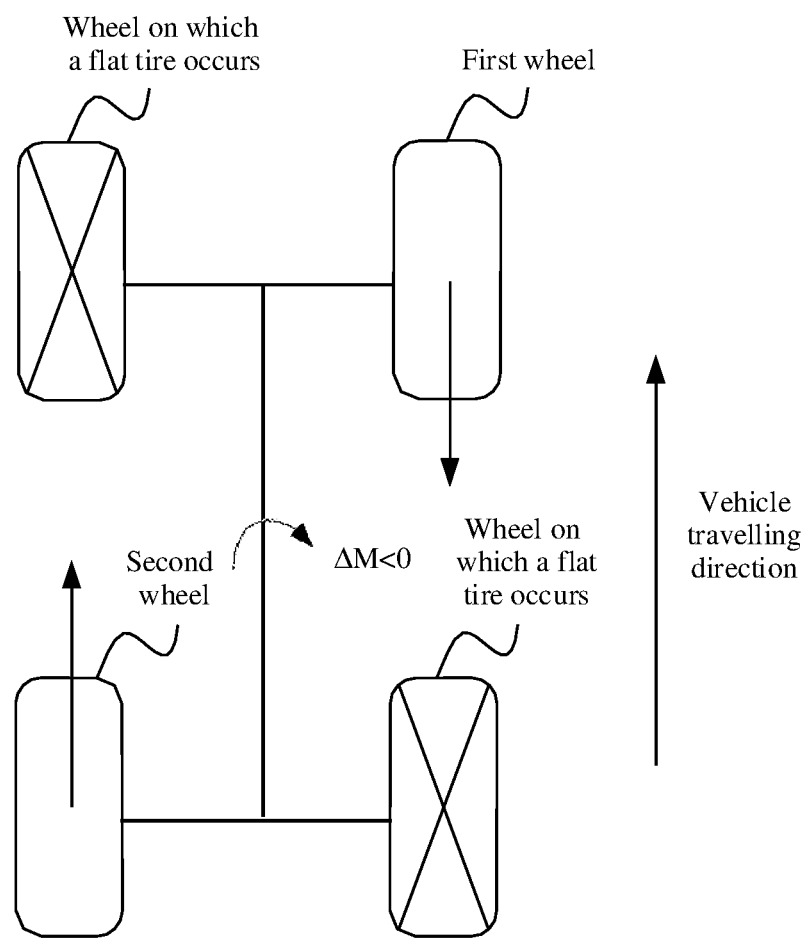
FIG. 6C is a schematic diagram of a distribution order and an action mode of another wheel torque required for control according to an embodiment of this application.

If the wheels in which the flat tire occurs are not wheels on a same side of a vehicle traveling direction, it is determined that a wheel on a right side of the vehicle traveling direction is a first wheel, where an action mode of the wheel torque distributed to the first wheel is braking, and it is determined that a remaining wheel other than the first wheel in the wheels in which no flat tire occurs is the second wheel, where an action mode of the wheel torque distributed to the second wheel is driving. FIG. 6C is a schematic diagram of a distribution order and an action mode of another wheel torque required for control according to an embodiment of this application.

Figure 7A:
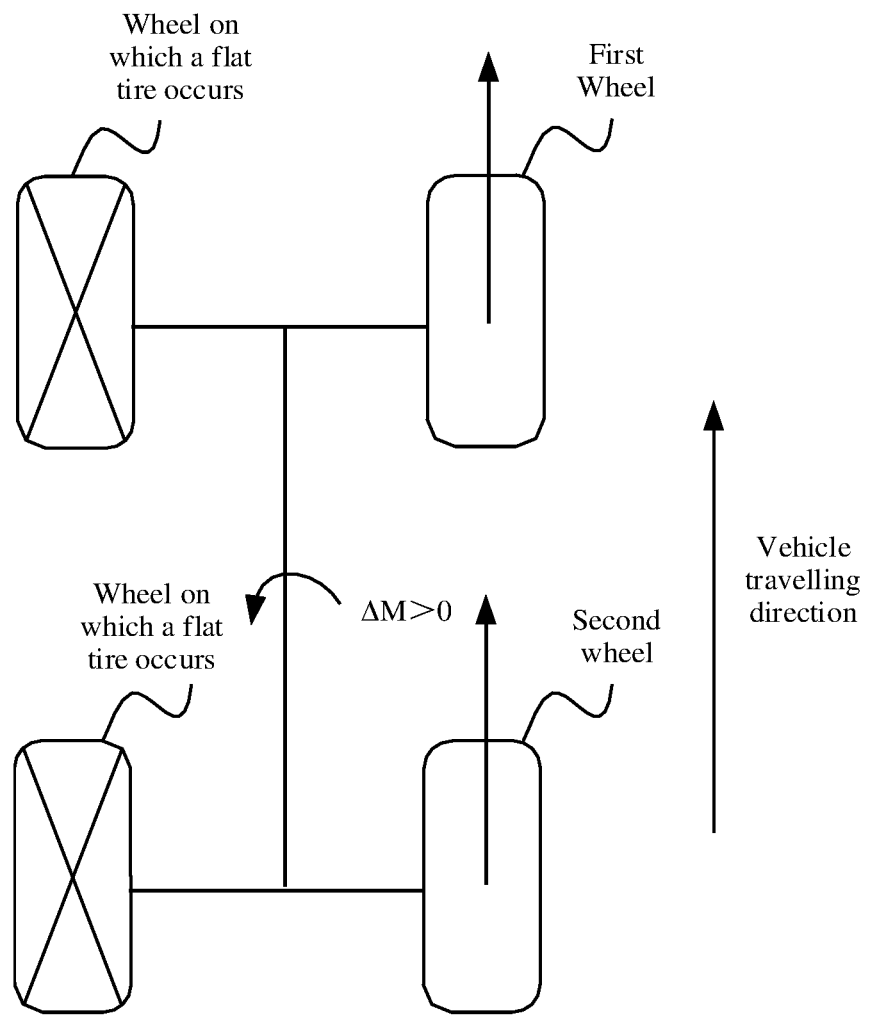
FIG. 7A is a schematic diagram of a distribution order and an action mode of another wheel torque required for control according to an embodiment of this application.

In a second case, the additional yaw moment is greater than zero. If both the wheels in which the flat tire occurs are wheels on a left side of a vehicle traveling direction, it is determined that, in the wheels in which no flat tire occurs, a wheel with a greater vertical force is a first wheel, where an action mode of the wheel torque distributed to the first wheel is driving, and it is determined that a remaining wheel other than the first wheel in the wheels in which no flat tire occurs is the second wheel, where an action mode of the wheel torque distributed to the second wheel is driving. FIG. 7A is a schematic diagram of a distribution order and an action mode of another wheel torque required for control according to an embodiment of this application. The vertical force of the first wheel is greater than a vertical force of the second wheel. In addition, if vertical forces of the two wheels in which no flat tire occurs are equal, either of the two wheels is selected as the first wheel, and the other remaining wheel in which no flat tire occurs is the second wheel.

Figure 7B:
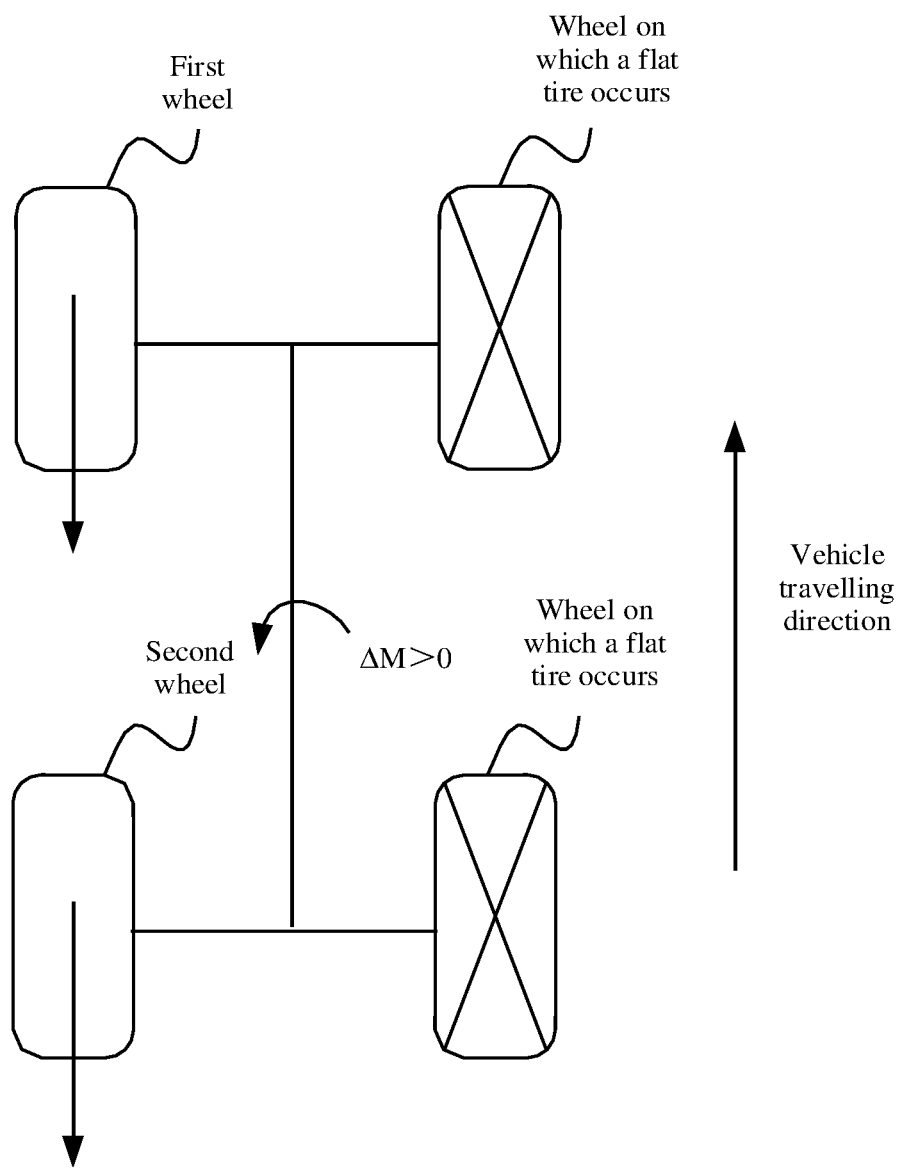
FIG. 7B is a schematic diagram of a distribution order and an action mode of another wheel torque required for control according to an embodiment of this application.

If both the wheels in which the flat tire occurs are wheels on a right side of a vehicle traveling direction, it is determined that, in the wheels in which no flat tire occurs, a wheel with a greater vertical force is a first wheel, where an action mode of the wheel torque distributed to the first wheel is braking, and it is determined that a remaining wheel other than the first wheel in the wheels in which no flat tire occurs is the second wheel, where an action mode of the wheel torque distributed to the second wheel is braking. FIG. 7B is a schematic diagram of a distribution order and an action mode of another wheel torque required for control according to an embodiment of this application. The vertical force of the first wheel is greater than a vertical force of the second wheel. In addition, if vertical forces of the two wheels in which no flat tire occurs are equal, either of the two wheels is selected as the first wheel, and the other remaining wheel in which no flat tire occurs is the second wheel.

Figure 7C:
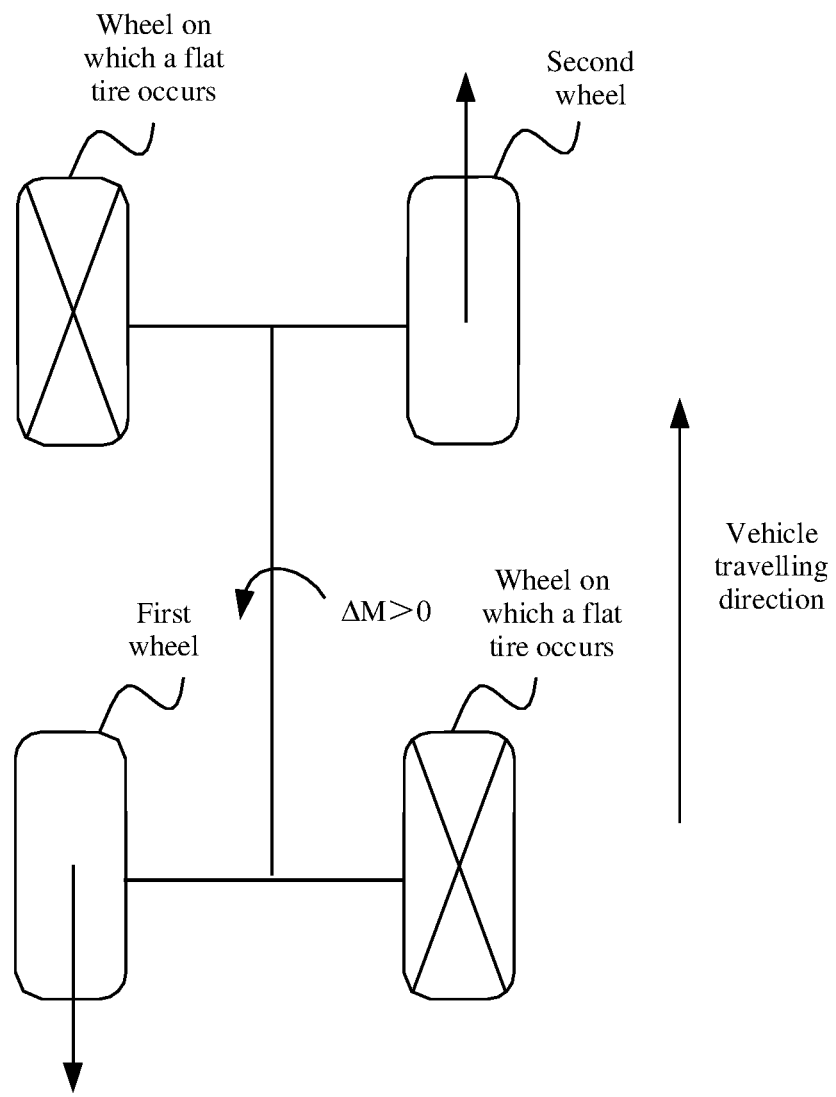
FIG. 7C is a schematic diagram of a distribution order and an action mode of another wheel torque required for control according to an embodiment of this application.

If the wheels in which the flat tire occurs are not wheels on a same side of a vehicle traveling direction, it is determined that a wheel on a left side of the vehicle traveling direction is a first wheel, where an action mode of the wheel torque distributed to the first wheel is braking, and it is determined that a remaining wheel other than the first wheel in the wheels in which no flat tire occurs is the second wheel, where an action mode of the wheel torque distributed to the second wheel is driving. FIG. 7C is a schematic diagram of a distribution order and an action mode of another wheel torque required for control according to an embodiment of this application.

(2) Determine values of wheel torques distributed to the wheels in which no flat tire occurs, and sequentially apply the wheel torques to the wheels in which no flat tire occurs by using the values of the distributed wheel torques and the action mode.

Optionally, there may be at least two manners of determining values of wheel torques distributed to the wheels in which no flat tire occurs, and sequentially applying the wheel torques to the wheels in which no flat tire occurs by using the values of the distributed wheel torques and the action mode. The following describes the two manners.

In a first manner, it is determined that an absolute value of a wheel torque distributed to a first wheel in the distribution order is a smaller value in an absolute value of the wheel torque required for control and a maximum road surface friction torque of the first wheel.

When the absolute value of the wheel torque distributed to the first wheel is the maximum road surface friction torque of the first wheel, it is determined that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel.

Then, the wheels in which the flat tire occurs are controlled based on the distribution order and the action mode of the wheel torque required for control, the absolute value of the wheel torque distributed to the first wheel, and the absolute value of the wheel torque distributed to the second wheel. The following describes a specific manner of controlling, in this case, the wheels in which the flat tire occurs.

First, the wheel torque is applied to the first wheel based on the action mode of the wheel torque of the first wheel by using the absolute value of the wheel torque distributed to the first wheel as a value of the torque. Then, the wheel torque is applied to the second wheel based on the action mode of the wheel torque of the second wheel by using the absolute value of the wheel torque distributed to the second wheel as a value of the torque. In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In a second manner, a method for determining the absolute value of the wheel torque distributed to the first wheel in the distribution order is the same as that in the first manner. After the determining that an absolute value of a wheel torque distributed to a first wheel in the distribution order is a smaller value in an absolute value of the wheel torque required for control and a maximum road surface friction torque of the first wheel, the method further includes: skipping distributing the wheel torque to the second wheel when the absolute value of the wheel torque distributed to the first wheel is the absolute value of the wheel torque required for control. This case indicates that the yaw moment generated by the flat tire can be compensated by applying the wheel torque to the first tire.

Then, the wheels in which the flat tire occurs are controlled based on the distribution order and the action mode of the wheel torque required for control and the absolute value of the wheel torque distributed to the first wheel. The following describes a specific manner of controlling, in this case, the wheels in which the flat tire occurs.

The wheel torque is applied to the first wheel based on the action mode of the wheel torque of the first wheel by using the absolute value of the wheel torque distributed to the first wheel as a value of the torque. In this manner, the vehicle can quickly compensate for the yaw moment generated by the flat tire, and the vehicle runs more stably in a process of compensating for the yaw moment generated by the flat tire.

When there are three wheels in which the flat tire occurs, the manner of controlling, based on the additional yaw moment, the wheels in which the flat tire occurs includes but is not limited to the following steps.

(1) Determine an action mode of a wheel torque required for control based on a value of the additional yaw moment and a position of a wheel in which no flat tire occurs.

A value of the wheel torque required for control is a quotient obtained by dividing a product of the additional yaw moment and a wheel diameter by an average track of the wheels.

Specifically, there are at least two cases for the method for determining an action mode of a wheel torque required for control based on a value of the additional yaw moment and a position of a wheel in which no flat tire occurs. The following describes the two cases.

Figure 8A:
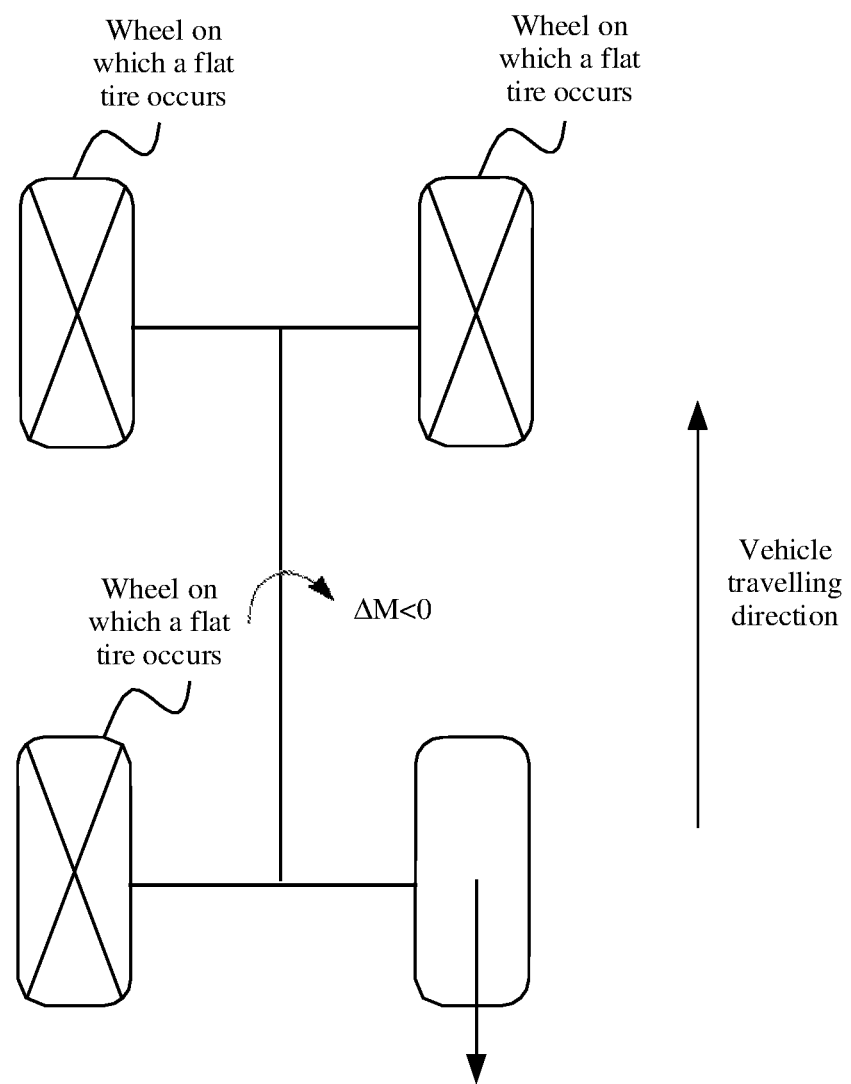
FIG. 8A is a schematic diagram of determining an action mode of a wheel torque required for control according to an embodiment of this application.

In a first case, the additional yaw moment is less than zero. If the wheel in which no flat tire occurs is a wheel on a left side of a vehicle traveling direction, an action mode of the wheel torque distributed to the wheel in which no flat tire occurs is driving. FIG. 8A is a schematic diagram of determining an action mode of a wheel torque required for control according to an embodiment of this application.

Figure 8B:
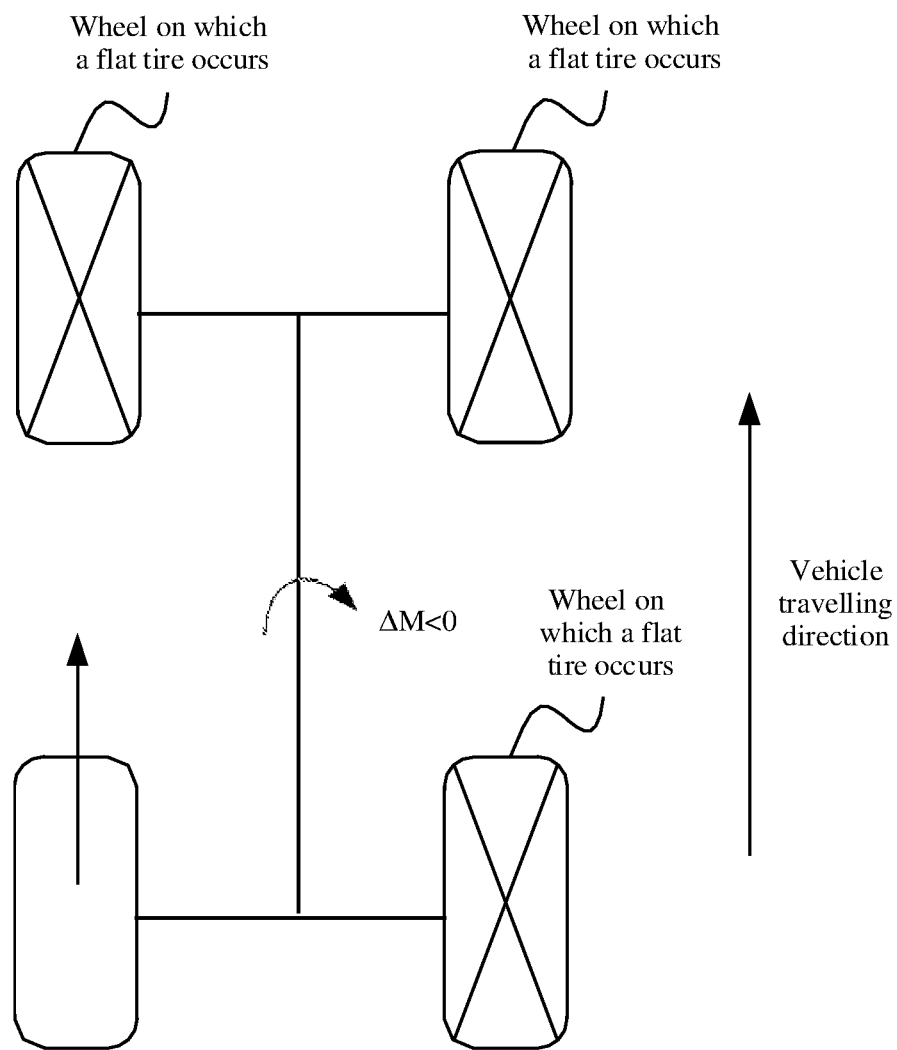
FIG. 8B is another schematic diagram of determining an action mode of a wheel torque required for control according to an embodiment of this application.

If the wheel in which no flat tire occurs is a wheel on a right side of a vehicle traveling direction, an action mode of the wheel torque distributed to the wheel in which no flat tire occurs is braking. FIG. 8B is another schematic diagram of determining an action mode of a wheel torque required for control according to an embodiment of this application.

Figure 9A:
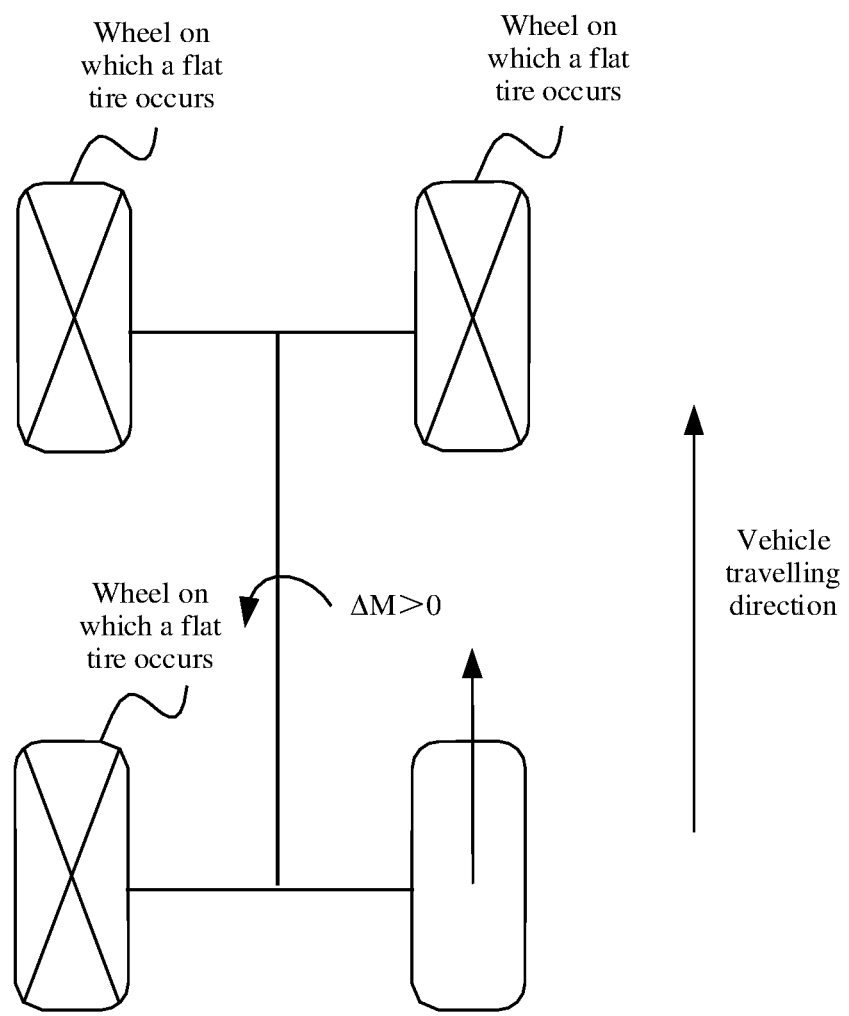
FIG. 9A is another schematic diagram of determining an action mode of a wheel torque required for control according to an embodiment of this application.

In a second case, the additional yaw moment is greater than zero. If the wheel in which no flat tire occurs is a wheel on a left side of a vehicle traveling direction, an action mode of the wheel torque distributed to the wheel in which no flat tire occurs is braking. FIG. 9A is another schematic diagram of determining an action mode of a wheel torque required for control according to an embodiment of this application.

Figure 9B:
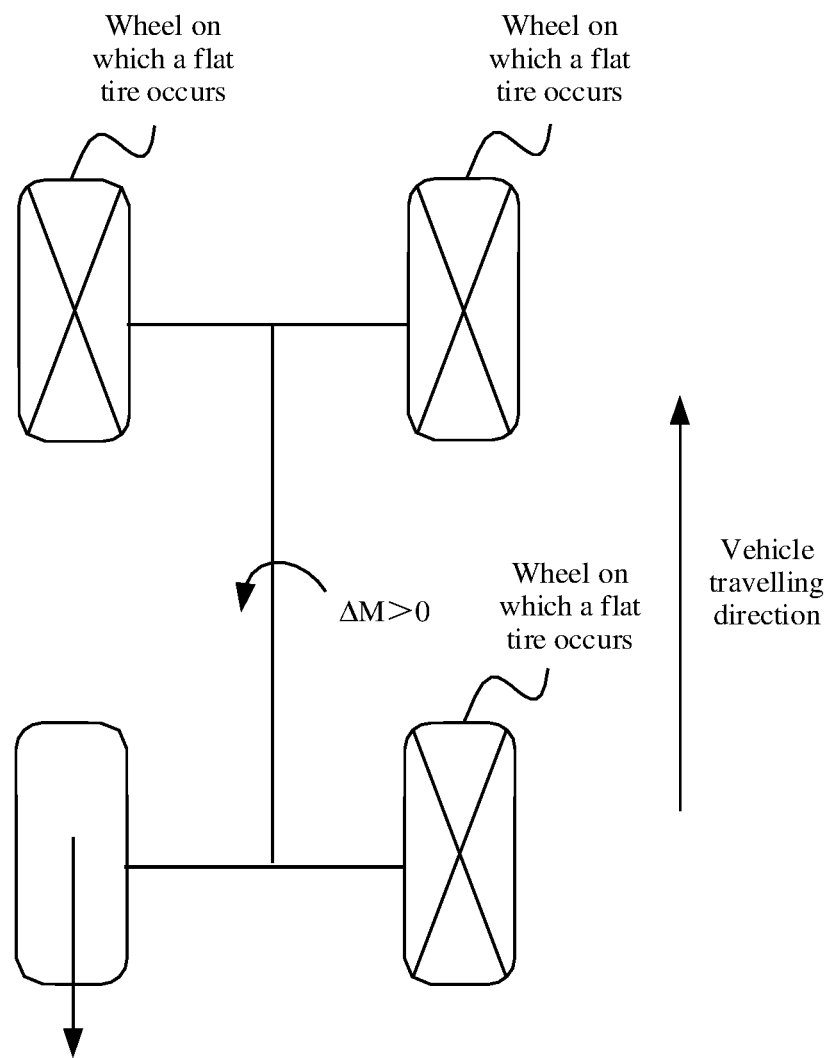
FIG. 9B is another schematic diagram of determining an action mode of a wheel torque required for control according to an embodiment of this application.

If the wheel in which no flat tire occurs is a wheel on a right side of a vehicle traveling direction, an action mode of the wheel torque distributed to the wheel in which no flat tire occurs is driving. FIG. 9B is another schematic diagram of determining an action mode of a wheel torque required for control according to an embodiment of this application.

(2) Determine a value of the wheel torque distributed to the wheel in which no flat tire occurs, and apply the wheel torque to the wheel in which no flat tire occurs by using the value of the distributed wheel torque and the action mode.

Specifically, first, it is determined that an absolute value of the wheel torque distributed to the wheel in which no flat tire occurs is a smaller value in an absolute value of the wheel torque required for control and a maximum road surface friction torque of the wheel in which no flat tire occurs. Then, the wheels in which the flat tire occurs are controlled based on the action mode of the wheel torque required for control and the absolute value of the wheel torque distributed to the wheel in which no flat tire occurs. A specific manner of controlling the wheels in which the flat tire occurs is applying the wheel torque to the wheel in which no flat tire occurs based on the action mode of the wheel torque distributed to the wheel in which no flat tire occurs by using the absolute value of the wheel torque distributed to the wheel in which no flat tire occurs as a value of the torque. In this manner, the vehicle can quickly compensate for the yaw moment generated by the flat tire.

In the method shown in FIG. 2, the lateral force interference compensation torque is added to the additional yaw moment of the vehicle in which the flat tire occurs, so that the additional yaw moment more accurately represents a torque required for controlling the vehicle in which the flat tire occurs. Therefore, a response time for adjusting a yaw rate of the vehicle in which the flat tire occurs to a desired yaw rate is reduced. In this way, the yaw moment generated by the flat tire can be quickly compensated, and a yaw degree of the vehicle can be reduced, so that the vehicle travels in a direction as desired by a driver.

Figure 10:
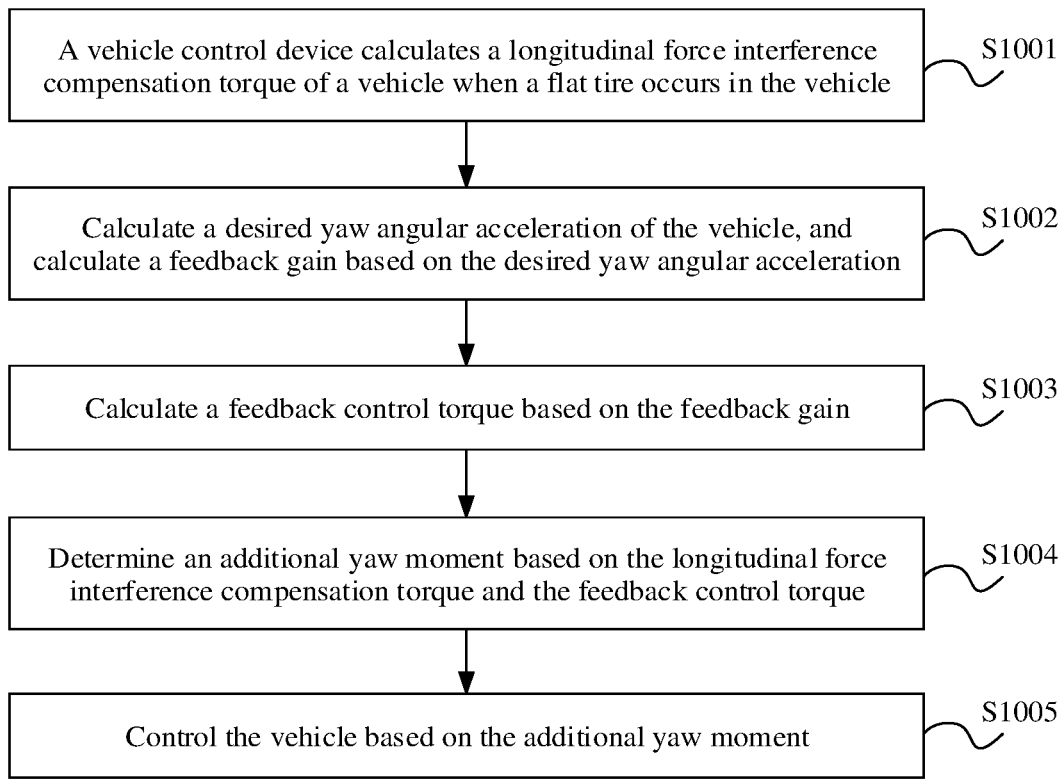
FIG. 10 is a flowchart of another vehicle control method according to an embodiment of this application.

FIG. 10 is a flowchart of another vehicle control method according to an embodiment of this application. The method may be implemented based on the architecture shown in FIG. 1. A vehicle control device described below may be the vehicle control unit VCU shown in FIG. 1, or may be an independent controller added to the vehicle control system shown in FIG. 1, or may be a vehicle electronic stability program ESP. The method includes but is not limited to the following steps.

S1001. The vehicle control device calculates a longitudinal force interference compensation torque of a vehicle when a flat tire occurs in the vehicle. For an implementation of this step, refer to the implementation of calculating the longitudinal interference compensation torque described in step S201. Details are not described herein again.

S1002. Calculate an absolute value of a desired yaw angular acceleration of the vehicle, and calculate a feedback gain based on the absolute value of the desired yaw angular acceleration.

To track and adjust the yaw rate in the travelling process of the vehicle, feedback control further needs to be added to the vehicle control. The feedback control is mainly completed by a proportional-integral controller (PI controller). $K_{P0}(v_x)$ and $K_{I0}(v_x)$ are basic feedback gains of the PI controller. The two values are values related to a longitudinal vehicle speed of a vehicle, and may be calibrated by using parameters of a vehicle in which no flat tire occurs.

Specifically, the calculating a feedback gain based on the absolute value of the desired yaw angular acceleration includes: determining, in a first preset relationship, an adjustment coefficient corresponding to the absolute value of the desired yaw angular acceleration, where the first preset relationship indicates a mapping relationship between absolute values of a plurality of desired yaw angular accelerations and a plurality of adjustment coefficients; and calculating the feedback gain based on the determined adjustment coefficient. The following describes in detail a manner of calculating the feedback gain based on the absolute value of the desired yaw angular acceleration. The manner includes but is not limited to the following steps.

(1) Calculate the absolute value of the desired yaw angular acceleration.

A manner of calculating the absolute value of the desired yaw angular acceleration is shown in formula 6-1:

$$|\dot{\gamma}^d| = \left|\frac{d\gamma^d}{dt}\right| \qquad 6\text{-}1$$

(2) Determine, in a first preset relationship, an adjustment coefficient corresponding to the absolute value of the desired yaw angular acceleration, and calculate the feedback gain based on the determined adjustment coefficient.

The first preset relationship indicates a mapping relationship between absolute values of a plurality of desired yaw angular accelerations and a plurality of adjustment coefficients. Specifically, the first preset relationship is: if the absolute value of the desired yaw angular acceleration falls within $[0, n_1]$, a corresponding adjustment coefficient is a, where a is a value in $[2, 5]$, and specifically, $n_1$ is a value in $[0.2, 0.3]$. if the absolute value of the desired yaw angular acceleration falls within $[n_1, n_2]$, a corresponding adjustment coefficient increases as the absolute value of the desired yaw angular acceleration increases, where the adjustment coefficient falls within $[a, b]$, and specifically, $n_2$ is a value in $[0.5, 0.6]$, and b is a value in $[8, 10]$. if the absolute value of the desired yaw angular acceleration falls within $[n_2, n_{th}]$, the adjustment coefficient is b, and specifically, $n_{th}$ is a value in $[0.8, 1]$. if the absolute value of the desired yaw angular acceleration falls within $[n_{th}, n_3]$, a corresponding adjustment coefficient decreases as the absolute value of the desired yaw angular acceleration increases, where the adjustment coefficient falls within $[b, c]$, specifically, $n_3$ is a value in $[3, 4]$, and c is a value in $[0, 1]$. if the absolute value of the desired yaw angular acceleration falls within $[n_3, +\infty)$, the adjustment coefficient is c. Specifically, values of $n_1$, $n_2$, $n_{th}$, and $n_3$ may be calibrated through an experiment, and values of b and c may also be calibrated through an experiment. Optionally, when performance of vehicles is different, values of the foregoing values may be different. Optionally, when positions of wheels in which the flat tire occurs are different, values of the foregoing values may also be different.

Figure 11:
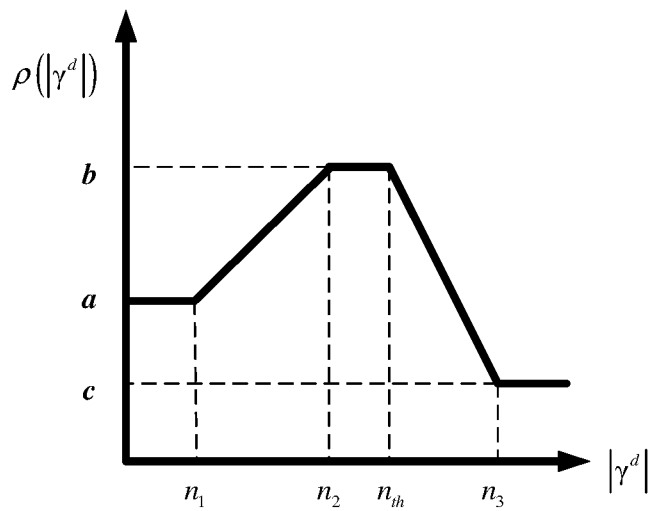
FIG. 11 is a schematic diagram of a first preset relationship according to an embodiment of this application.

FIG. 11 is a schematic diagram of a first preset relationship according to an embodiment of this application. It should be noted that, a change that "the adjustment coefficient increases as the absolute value of the desired yaw angular acceleration increases" and a change that "the adjustment coefficient decreases as the absolute value of the desired yaw angular acceleration increases" that are shown in FIG. 11 do not represent a linear change of a correspondence between the adjustment coefficient and the absolute value of the desired yaw angular acceleration, but only show change trends, and changes that "the adjustment coefficient increases as the absolute value of the desired yaw angular acceleration increases" and "the adjustment coefficient decreases as the absolute value of the desired yaw angular acceleration increases" that are shown in FIG. 11 may be non-linear changes.

In this manner, when the absolute value $|\dot{\gamma}^d|$ of the desired yaw angular acceleration is greater than $n_1$ and is less than $n_2$, a change trend of the adjustment coefficient is that the adjustment coefficient increases as $|\dot{\gamma}^d|$ increases, so that a degree of a delayed response of the yaw rate can be reduced, and the vehicle can quickly compensate for the yaw moment required by the vehicle. When $|\dot{\gamma}^d|$ is greater than the threshold $n_{th}$ and is less than $n_3$, the change trend of the adjustment coefficient is that the adjustment coefficient decreases as $|\dot{\gamma}^d|$ increases. In this manner, considering that the driver may over-correct a steering wheel due to panic after the flat tire occurs, excessive vehicle control caused by over-correction by the driver can be avoided by reducing the feedback gain of the PI controller.

Specifically, the calculating the feedback gain based on the determined adjustment coefficient includes: multiplying the feedback gain by the adjustment coefficient to obtain the feedback gain. That is, a manner of calculating the feedback gains $K_P(v_x)$ and $K_I(v_x)$ is shown in formula 6-2:

$$K_P(v_x)=K_{P0}(v_x)\cdot\rho(|\dot{\gamma}^d|)$$

$$K_I(v_x)=K_{I0}(v_x)\cdot\rho(|\dot{\gamma}^d|) \quad 6\text{-}2$$

$\rho(|\dot{\gamma}^d|)$ is the adjustment coefficient corresponding to the absolute value of the desired yaw angular acceleration.

Optionally, there may be another manner of adjusting the feedback gain of the proportional-integral controller based on the absolute value of the desired yaw angular acceleration. The following are two examples.

Manner 1: The adjustment coefficient corresponding to the absolute value of the desired yaw angular acceleration is determined from a second preset relationship, where the second preset relationship indicates a mapping relationship between absolute values of a plurality of desired yaw angular accelerations and a plurality of adjustment coefficients. The feedback gain is divided by the adjustment coefficient to obtain the adjusted feedback gain.

Manner 2: The adjustment coefficient corresponding to the absolute value of the desired yaw angular acceleration is determined from a third preset relationship, where the third preset relationship is a functional relationship in which the absolute value $|\dot{\gamma}^d|$ of the desired yaw angular acceleration and a longitudinal speed $v_x$ of the vehicle are independent variables, and the adjustment coefficient $\rho(|\dot{\gamma}^d|)$ is a dependent variable. The absolute value $|\dot{\gamma}^d|$ of the desired yaw angular acceleration and the longitudinal speed $v_x$ of the vehicle are substituted into the third preset relationship for calculation, to obtain the adjusted feedback gain.

S1003. Calculate a feedback control torque based on the feedback gain.

Specifically, a manner of calculating the feedback control torque based on the feedback gain is shown in formula 6-3:

$$\Delta M_{fb}=K_P(v_x)(\gamma^d-\gamma)+K_I(v_x)\int_{t_0}^{t}(\gamma^d-\gamma) \quad 6\text{-}3$$

S1004. Determine an additional yaw moment based on the longitudinal force interference compensation torque and the feedback control torque.

Specifically, the applied additional yaw moment is a sum of the longitudinal force interference compensation torque and the feedback control torque. A manner of calculating the required additional yaw moment ΔM based on the longitudinal force interference compensation torque $\Delta M_{fx}$ and the feedback control torque $\Delta M_{fb}$ is shown in formula 6-4:

$$\Delta M=\Delta M_{fx}+\Delta M_{fb} \quad 6\text{-}4$$

S1005. Control a wheel in which the flat tire occurs, based on the additional yaw moment. For an implementation of this step, refer to the implementation of controlling the vehicle based on the additional yaw moment described in step S205. Details are not described herein again.

In the method shown in FIG. 10, a feedback gain may be calculated based on an absolute value of a desired yaw angular acceleration of a vehicle in which a flat tire occurs, so that a problem of a delayed response of a yaw rate of the vehicle in which the flat tire occurs can be alleviated. Therefore, a response time for adjusting the yaw rate of the vehicle in which the flat tire occurs to a desired yaw rate is reduced. In this way, a yaw moment generated by the flat tire can be quickly compensated, and a yaw degree of the vehicle can be reduced, so that the vehicle travels in a direction as desired by a driver.

In an optional implementation, the vehicle control device may control, with reference to the vehicle control methods shown in FIG. 2 and FIG. 10, a vehicle in which a flat tire occurs. Specifically, in this implementation, for a manner of calculating the feedback control torque of the vehicle, refer to the manner described in step S1002 and step S1003 in FIG. 10. For a manner of calculating the additional yaw moment of the vehicle, refer to the manner described in step S203 in FIG. 2. In this implementation, the lateral force interference compensation torque may be added to the additional yaw moment of the vehicle in which the flat tire occurs, so that the additional yaw moment more accurately represents the torque required for controlling the vehicle in which the flat tire occurs, and the feedback gain may be calculated based on the absolute value of the desired yaw angular acceleration of the vehicle in which the flat tire occurs, so that the problem of the delayed response of the yaw rate of the vehicle in which the flat tire occurs can be alleviated. Therefore, the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

The foregoing describes the method embodiments of this application, and the following describes corresponding apparatus embodiments.

Figure 12:
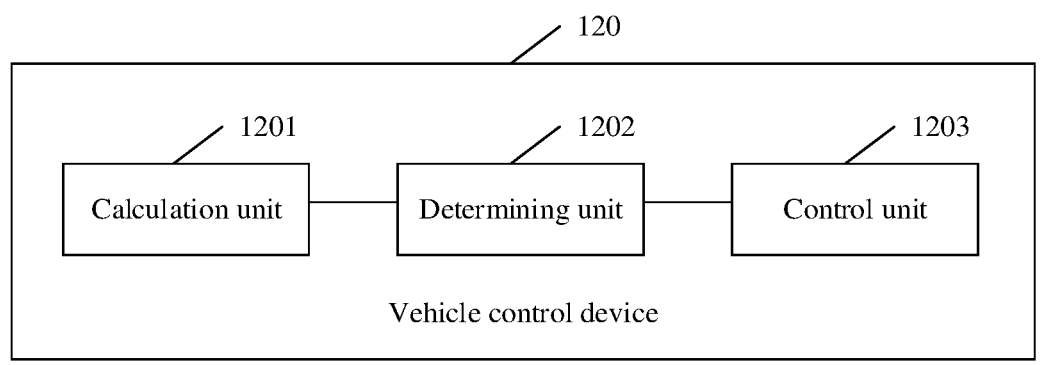
FIG. 12 is a schematic diagram of a vehicle control device according to an embodiment of this application.

FIG. 12 is a schematic diagram of a vehicle control device according to an embodiment of this application. The vehicle control device 50 includes a calculation unit 1201, a determining unit 1202, and a control unit 1203. The following describes the calculation unit 1201, the determining unit 1202, and the control unit 1203.

The calculation unit 1201 is configured to calculate a longitudinal force interference compensation torque and a lateral force interference compensation torque of a vehicle when a flat tire occurs in the vehicle.

The calculation unit 1201 is further configured to calculate a feedback control torque of the vehicle.

The determining unit 1202 is configured to determine an additional yaw moment based on the longitudinal force interference compensation torque, the feedback control torque, and the lateral force interference compensation torque.

The control unit 1203 is configured to control, based on the additional yaw moment, a wheel in which the flat tire occurs.

The calculation unit 1201 may receive status information (for example, a longitudinal acceleration, a lateral acceleration, a yaw rate, a steering wheel angle, tire pressure, a wheel speed, and a suspension travel distance) of the vehicle, and may obtain vehicle control related parameters (for example, a longitudinal vehicle speed, a centroid slip angle, a road surface attachment coefficient, and a wheel vertical force) by processing the status information. Specifically, the vehicle control device further includes an identification unit, configured to identify whether a flat tire occurs in the vehicle and a location of the flat tire of the wheel. When the flat tire occurs in the vehicle, the calculation unit 1201 calculates the longitudinal force interference compensation torque, the lateral force interference compensation torque, and the feedback control torque of the vehicle, the determining unit 1202 then determines the additional yaw moment based on the longitudinal force interference compensation torque, the feedback control torque, and the lateral force interference compensation torque, and then the control unit 1203 controls (for example, through motor control or hydraulic control), based on the additional yaw moment, the wheel on which the flat tire occurred.

According to this device, the lateral force interference compensation torque is added to the additional yaw moment, so that the additional yaw moment more accurately represents a torque required for controlling the vehicle in which the flat tire occurs, and a response time for adjusting the yaw rate of the vehicle in which the flat tire occurs to a desired yaw rate is reduced. In this way, a yaw moment generated by the flat tire can be quickly compensated, and a yaw degree of the vehicle can be reduced, so that the vehicle travels in the direction as desired by a driver.

In an optional implementation, the calculation unit 1201 is specifically configured to calculate an absolute value of a desired yaw angular acceleration of the vehicle, and calculate a feedback gain based on the absolute value of the desired yaw angular acceleration; and calculate the feedback control torque based on the feedback gain. According to this device, the feedback gain may be calculated based on the absolute value of the desired yaw angular acceleration, so that a problem of a delayed response of the yaw rate of the vehicle in which the flat tire occurs can be alleviated, and the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in a direction as desired by the driver.

In an optional implementation, the calculation unit 1201 further includes a determining subunit and a calculation subunit, where the determining subunit is configured to determine, in a first preset relationship, an adjustment coefficient corresponding to the absolute value of the desired yaw angular acceleration, where the first preset relationship indicates a mapping relationship between absolute values of a plurality of desired yaw angular accelerations and a plurality of adjustment coefficients; and the calculating subunit is configured to calculate the feedback gain based on the determined adjustment coefficient.

In an optional implementation, the calculation subunit is specifically configured to multiply a basic feedback gain by the adjustment coefficient to obtain the feedback gain.

In an optional implementation, the first preset relationship is: if the absolute value of the desired yaw angular acceleration falls within $[0, n_1]$, the corresponding adjustment coefficient is a, where a is a value in $[2, 5]$; if the absolute value of the desired yaw angular acceleration falls within $[n_1, n_2]$, the corresponding adjustment coefficient increases as the absolute value of the desired yaw angular acceleration increases, where the adjustment coefficient falls within $[a, b]$; if the absolute value of the desired yaw angular acceleration falls within $[n_2, n_{th}]$, the adjustment coefficient is b; if the absolute value of the desired yaw angular acceleration falls within $[n_{th}, n_3]$, the corresponding adjustment coefficient decreases as the absolute value of the desired yaw angular acceleration increases, where the adjustment coefficient falls within $[b, c]$, and c is a value in $[0,1]$; or if the absolute value of the desired yaw angular acceleration falls within $[n_3, +\infty)$, the adjustment coefficient is c.

In this device, when the absolute value $|\dot{\gamma}^d|$ of the desired yaw angular acceleration is greater than $n_1$, and is less than $n_2$, a change trend of the adjustment coefficient is that the adjustment coefficient increases as $|\dot{\gamma}^d|$ increases, so that a degree of a delayed response of the yaw rate can be reduced, and the vehicle can quickly compensate for the yaw moment required by the vehicle. When $|\dot{\gamma}^d|$ is greater than the threshold $n_{th}$ and is less than $n_3$, the change trend of the adjustment coefficient is that the adjustment coefficient decreases as $|\dot{\gamma}^d|$ increases. In this manner, considering that the driver may over-correct a steering wheel due to panic after the flat tire occurs, excessive vehicle control caused by over-correction by the driver can be avoided by reducing the feedback gain.

In an optional implementation, when there is one wheel in which the flat tire occurs, the control unit 1203 is specifically configured to: determine a distribution order and an action mode of a wheel torque required for control based on a value of the additional yaw moment, a position of the wheel in which the flat tire occurs, and vertical forces of wheels in which no flat tire occurs, where a value of the wheel torque required for control is a quotient obtained by dividing a product of the additional yaw moment and a wheel diameter by an average track of the wheels; determine that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determine that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; when the absolute value of the wheel torque distributed to the second wheel is the maximum road surface friction torque of the second wheel, determine that an absolute value of a wheel torque distributed to a third wheel in the distribution order is a smaller value in a maximum road surface friction torque of the third wheel and an absolute value of a difference between the maximum road surface friction torque of the second wheel and the difference between the absolute value of the wheel torque required for control and the maximum road surface friction torque of the first wheel; and control the wheel in which the flat tire occurs, based on the distribution order and the action mode of the wheel torque required for control, the absolute value of the wheel torque distributed to the first wheel, the absolute value of the wheel torque distributed to the second wheel, and the absolute value of the wheel torque distributed to the third wheel. According to this device, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In an optional implementation, the control unit 1203 is further configured to: skip distributing the wheel torques to the second wheel and the third wheel when the absolute value of the wheel torque distributed to the first wheel is the absolute value of the wheel torque required for control; and control the wheel in which the flat tire occurs, based on the distribution order and the action mode of the wheel torque required for control and the absolute value of the wheel torque distributed to the first wheel.

In an optional implementation, the control unit 1203 is further configured to: skip distributing the wheel torque to the third wheel when the absolute value of the wheel torque distributed to the second wheel is the absolute value of the difference between the absolute value of the wheel torque required for control and the maximum road surface friction torque of the first wheel; and control the wheel in which the flat tire occurs, based on the distribution order and the action mode of the wheel torque required for control, the absolute value of the wheel torque distributed to the first wheel, and the absolute value of the wheel torque distributed to the second wheel.

In an optional implementation, the control unit 1203 is further configured to: when the additional yaw moment is less than zero, determine that, in the wheels in which no flat tire occurs, a wheel with a greater vertical force in wheels on a right side of a vehicle traveling direction is the first wheel, where an action mode of the wheel torque distributed to the first wheel is braking; and if in the wheels in which no flat tire occurs, there are two wheels on the right side of the vehicle traveling direction, determine that a wheel other than the first wheel in the wheels on the right side of the vehicle traveling direction is the second wheel, where an action mode of the wheel torque distributed to the second wheel is braking, and determine that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the right side of the vehicle traveling direction, determine that, in the wheels in which no flat tire occurs, a wheel that is diagonal to the first wheel is the second wheel, where an action mode of the wheel torque distributed to the second wheel is driving, and determine that a remaining wheel other than the first wheel and the second wheel in the wheels in which no flat tire occurs is the third wheel, where an action mode of the wheel torque distributed to the third wheel is driving.

In an optional implementation, the control unit 1203 is further configured to: when the additional yaw moment is greater than zero, determine that, in the wheels in which no flat tire occurs, a wheel with a greater vertical force in wheels on a left side of a vehicle traveling direction is the first wheel, where an action mode of the wheel torque distributed to the first wheel is braking; and if in the wheels in which no flat tire occurs, there are two wheels on the left side of the vehicle traveling direction, determine that a wheel other than the first wheel in the wheels on the left side of the vehicle traveling direction is the second wheel, where an action mode of the wheel torque distributed to the second wheel is braking, and determine that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the left side of the vehicle traveling direction, determine that, in the wheels in which no flat tire occurs, a wheel that is diagonal to the first wheel is the second wheel, where an action mode of the wheel torque distributed to the second wheel is driving, and determine that a remaining wheel other than the first wheel and the second wheel in the wheels in which no flat tire occurs is the third wheel, where an action mode of the wheel torque distributed to the third wheel is driving.

In an optional implementation, there are two wheels in which a flat tire occurs, and the control unit 1203 is specifically configured to: determine a distribution order and an action mode of a wheel torque required for control based on a value of the additional yaw moment, positions of the wheels in which no flat tire occurs, and vertical forces of wheels in which no flat tire occurs, where a value of the wheel torque required for control is a quotient obtained by dividing a product of the additional yaw moment and a wheel diameter by an average track of the wheels; determine that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determine that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; and control the wheels in which the flat tire occurs, based on the distribution order and the action mode of the wheel torque required for control, the absolute value of the wheel torque distributed to the first wheel, and the absolute value of the wheel torque distributed to the second wheel.

In an optional implementation, the control unit 1203 is further configured to: skip distributing the wheel torque to the second wheel when the absolute value of the wheel torque distributed to the first wheel is the absolute value of the wheel torque required for control; and control the wheels in which the flat tire occurs, based on the distribution order and the action mode of the wheel torque required for control and the absolute value of the wheel torque distributed to the first wheel.

In an optional implementation, the control unit 1203 is further configured to: when the additional yaw moment is less than zero, if both the wheels in which the flat tire occurs are wheels on a left side of a vehicle traveling direction, determine that, in the wheels in which no flat tire occurs, a wheel with a greater vertical force is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is braking; if both the wheels in which the flat tire occurs are wheels on a right side of a vehicle traveling direction, determine that, in the wheels in which no flat tire occurs, a wheel with a greater vertical force is the first wheel, where an action mode of the wheel torque distributed to the first wheel is driving, and determine that a remaining wheel other than the first wheel in the wheels in which no flat tire occurs is the second wheel, where an action mode of the wheel torque distributed to the second wheel is driving; or if the wheels in which the flat tire occurs are not wheels on a same side of a vehicle traveling direction, determine that a wheel on a right side of the vehicle traveling direction is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is driving.

In an optional implementation, the control unit 1203 is further configured to: when the additional yaw moment is greater than zero, if both the wheels in which the flat tire occurs are wheels on a left side of a vehicle traveling direction, determine that, in the wheels in which no flat tire occurs, a wheel with a greater vertical force is the first wheel, where an action mode of the wheel torque distributed to the first wheel is driving, and determine that a remaining wheel other than the first wheel in the wheels in which no flat tire occurs is the second wheel, where an action mode of the wheel torque distributed to the second wheel is driving; if both the wheels in which the flat tire occurs are wheels on a right side of a vehicle traveling direction, determine that, in the wheels in which no flat tire occurs, a wheel with a greater vertical force is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is braking; or if the wheels in which the flat tire occurs are not wheels on a same side of a vehicle traveling direction, determine that a wheel on a left side of the vehicle traveling direction is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is driving.

In an optional implementation, when there are three wheels in which the flat tire occurs, and the control unit 1203 is specifically configured to: determine an action mode of a wheel torque required for control based on a value of the additional yaw moment and a position of a wheel in which no flat tire occurs, where a value of the wheel torque required for control is a quotient obtained by dividing a product of the additional yaw moment and a wheel diameter by an average track of the wheels; determine that an absolute value of a wheel torque distributed to the wheel in which no flat tire occurs is a smaller value in an absolute value of the wheel torque required for control and a maximum road surface friction torque of the wheel in which no flat tire occurs; and control the wheels in which the flat tire occurs, based on the action mode of the wheel torque required for control and the absolute value of the wheel torque distributed to the wheel in which no flat tire occurs.

In an optional implementation, the control unit 1203 is further configured to: when the additional yaw moment is less than zero, if the wheel in which no flat tire occurs is a wheel on a left side of a vehicle traveling direction, determine that an action mode of the wheel torque distributed to the wheel in which no flat tire occurs is driving, or if the wheel in which no flat tire occurs is a wheel on a right side of a vehicle traveling direction, determine that an action mode of the wheel torque distributed to the wheel in which no flat tire occurs is braking; or when the additional yaw moment is greater than zero, if the wheel in which no flat tire occurs is a wheel on a left side of a vehicle traveling direction, determine that an action mode of the wheel torque distributed to the wheel in which no flat tire occurs is braking, or if the wheel in which no flat tire occurs is a wheel on a right side of a vehicle traveling direction, determine that an action mode of the wheel torque distributed to the wheel in which no flat tire occurs is driving.

For implementation of each operation in FIG. 12, refer to the corresponding description of the method embodiment shown in FIG. 2 or FIG. 10.

In the vehicle control device shown in FIG. 12, the lateral force interference compensation torque is added to the additional yaw moment of the vehicle in which the flat tire occurs, so that the additional yaw moment more accurately represents the torque required for controlling the vehicle in which the flat tire occurs, and the feedback gain may be calculated based on the absolute value of the desired yaw angular acceleration, so that the problem of the delayed response of the yaw rate of the vehicle in which the flat tire occurs can be alleviated. Therefore, the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

Figure 13:
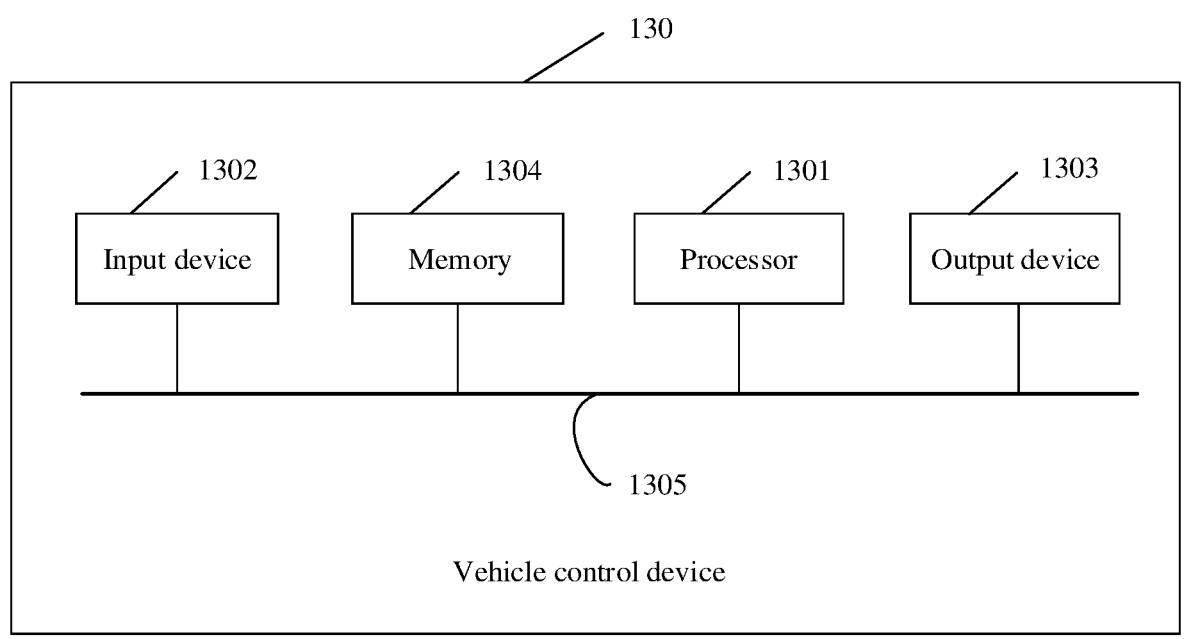
FIG. 13 is a schematic diagram of another vehicle control device according to an embodiment of this application.

FIG. 13 is a schematic diagram of another vehicle control device according to an embodiment of this application. The first device 130 may include one or more processors 1301, one or more input devices 1302, one or more output devices 1303, and a memory 1304. The processor 1301, the input device 1302, the output device 1303, and the memory 1304 are connected by using a bus 1305. The memory 1302 is configured to store an instruction.

The processor 1301 may be a central processing unit, or the processor may be another general purpose processor, a digital signal processor, an application-specific integrated circuit, another programmable logic device, or the like. The general purpose processor may be a microprocessor, or the processor may be any conventional processor or the like.

The input device 1302 may include a communications interface, a data line, and the like. The output device 1303 may include a data line, a communications interface, and the like.

The memory 1304 may include a read-only memory and a random access memory, and provide an instruction and data to the processor 1301. A part of the memory 1304 may further include a non-volatile random access memory. For example, the memory 1304 may further store information of a storage device type.

The processor 1301 is configured to run the instruction stored in the memory 1304 to perform the following operations: calculating a longitudinal force interference compensation torque and a lateral force interference compensation torque of a vehicle when a flat tire occurs in the vehicle; calculating a feedback control torque of the vehicle; determining an additional yaw moment based on the longitudinal force interference compensation torque, the feedback control torque, and the lateral force interference compensation torque; and controlling, based on the additional yaw moment, a wheel in which the flat tire occurs.

In this method, the lateral force interference compensation torque is added to the additional yaw moment, so that the additional yaw moment more accurately represents a torque required for controlling the vehicle in which the flat tire occurs, and a response time for adjusting a yaw rate of the vehicle in which the flat tire occurs to a desired yaw rate is reduced. In this way, a yaw moment generated by the flat tire can be quickly compensated, and a yaw degree of the vehicle can be reduced, so that the vehicle travels in a direction as desired by a driver.

In an optional implementation, the processor 1301 is further configured to calculate an absolute value of a desired yaw angular acceleration of the vehicle, and calculate a feedback gain based on the absolute value of the desired yaw angular acceleration; and calculate the feedback control torque based on the feedback gain. In this manner, a feedback gain of a proportional-integral controller may be adjusted based on the absolute value of the desired yaw angular acceleration, so that a problem of a delayed response of the yaw rate of the vehicle in which the flat tire occurs can be alleviated, and the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

In an optional implementation, the processor 1301 is further configured to: determine, in a first preset relationship, an adjustment coefficient corresponding to the absolute value of the desired yaw angular acceleration, where the first preset relationship indicates a mapping relationship between absolute values of a plurality of desired yaw angular accelerations and a plurality of adjustment coefficients; and calculating the feedback gain based on the determined adjustment coefficient.

In an optional implementation, the processor 1301 is further configured to multiply a basic feedback gain by the adjustment coefficient to obtain the feedback gain.

In an optional implementation, the first preset relationship is: if the absolute value of the desired yaw angular acceleration falls within $[0, n_1]$, the corresponding adjustment coefficient is a, where a is a value in $[2, 5]$; if the absolute value of the desired yaw angular acceleration falls within $[n_1, n_2]$, the corresponding adjustment coefficient increases as the absolute value of the desired yaw angular acceleration increases, where the adjustment coefficient falls within $[a, b]$; if the absolute value of the desired yaw angular acceleration falls within $[n_2, n_{th}]$, the adjustment coefficient is b; if the absolute value of the desired yaw angular acceleration falls within $[n_2, n_3]$, the corresponding adjustment coefficient decreases as the absolute value of the desired yaw angular acceleration increases, where the adjustment coefficient falls within $[b, c]$, and c is a value in $[0,1]$; or if the absolute value of the desired yaw angular acceleration falls within $[n_3, +\infty)$, the adjustment coefficient is c.

In this manner, when the absolute value $|\dot{\gamma}^d|$ of the desired yaw angular acceleration is greater than $n_1$ and is less than $n_2$, a change trend of the adjustment coefficient is that the adjustment coefficient increases as $|\dot{\gamma}^d|$ increases, so that a degree of a delayed response of the yaw rate can be reduced, and the vehicle can quickly compensate for the yaw moment required by the vehicle. When $|\dot{\gamma}^d|$ is greater than the threshold $n_{th}$ and is less than $n_3$, the change trend of the adjustment coefficient is that the adjustment coefficient decreases as $|\dot{\gamma}^d|$ increases. In this manner, considering that the driver may over-correct a steering wheel due to panic after the flat tire occurs, excessive vehicle control caused by over-correction by the driver can be avoided by reducing the feedback gain.

In an optional implementation, when there is one wheel in which the flat tire occurs, the processor 1301 is further configured to: determine a distribution order and an action mode of a wheel torque required for control based on a value of the additional yaw moment, a position of the wheel in which the flat tire occurs, and vertical forces of wheels in which no flat tire occurs, where a value of the wheel torque required for control is a quotient obtained by dividing a product of the additional yaw moment and a wheel diameter by an average track of the wheels; determine that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determine that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; when the absolute value of the wheel torque distributed to the second wheel is the maximum road surface friction torque of the second wheel, determine that an absolute value of a wheel torque distributed to a third wheel in the distribution order is a smaller value in a maximum road surface friction torque of the third wheel and an absolute value of a difference between the maximum road surface friction torque of the second wheel and the difference between the absolute value of the wheel torque required for control and the maximum road surface friction torque of the first wheel; and control the wheel in which the flat tire occurs, based on the distribution order and the action mode of the wheel torque required for control, the absolute value of the wheel torque distributed to the first wheel, the absolute value of the wheel torque distributed to the second wheel, and the absolute value of the wheel torque distributed to the third wheel.

In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In an optional implementation, after the processor 1301 determines that the absolute value of the wheel torque distributed to the first wheel in the distribution order is the smaller value in the absolute value of the wheel torque required for control and the maximum road surface friction torque of the first wheel, the processor 1301 is further configured to: skip distributing the wheel torques to the second wheel and the third wheel when the absolute value of the wheel torque distributed to the first wheel is the absolute value of the wheel torque required for control; and control the wheels in which the flat tire occurs, based on the distribution order and the action mode of the wheel torque required for control and the absolute value of the wheel torque distributed to the first wheel. In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In an optional implementation, after the processor 1301 determines that the absolute value of the wheel torque distributed to the second wheel in the distribution order is the smaller value in the maximum road surface friction torque of the second wheel and the absolute value of the difference between the absolute value of the wheel torque required for control and the maximum road surface friction torque of the first wheel, the processor 1301 is further configured to: skip distributing the wheel torque to the third wheel when the absolute value of the wheel torque distributed to the second wheel is the absolute value of the difference between the absolute value of the wheel torque required for control and the maximum road surface friction torque of the first wheel; and control the wheel in which the flat tire occurs, based on the distribution order and the action mode of the wheel torque required for control, the absolute value of the wheel torque distributed to the first wheel, and the absolute value of the wheel torque distributed to the second wheel. In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In an optional implementation, the processor 1301 is further configured to: when the additional yaw moment is less than zero, determine that, in the wheels in which no flat tire occurs, a wheel with a greater vertical force in wheels on a right side of a vehicle traveling direction is the first wheel, where an action mode of the wheel torque distributed to the first wheel is braking; and if in the wheels in which no flat tire occurs, there are two wheels on the right side of the vehicle traveling direction, determine that a wheel other than the first wheel in the wheels on the right side of the vehicle traveling direction is the second wheel, where an action mode of the wheel torque distributed to the second wheel is braking, and determine that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the right side of the vehicle traveling direction, determine that, in the wheels in which no flat tire occurs, a wheel that is diagonal to the first wheel is the second wheel, where an action mode of the wheel torque distributed to the second wheel is driving, and determine that a remaining wheel other than the first wheel and the second wheel in the wheels in which no flat tire occurs is the third wheel, where an action mode of the wheel torque distributed to the third wheel is driving.

In an optional implementation, the processor 1301 is further configured to: when the additional yaw moment is greater than zero, determine that, in the wheels in which no flat tire occurs, a wheel with a greater vertical force in wheels on a left side of a vehicle traveling direction is the first wheel, where an action mode of the wheel torque distributed to the first wheel is braking; and if in the wheels in which no flat tire occurs, there are two wheels on the left side of the vehicle traveling direction, determine that a wheel other than the first wheel in the wheels on the left side of the vehicle traveling direction is the second wheel, where an action mode of the wheel torque distributed to the second wheel is braking, and determine that a remaining wheel other than the first wheel and the second wheel in the wheels in which no flat tire occurs is the third wheel, where an action mode of the wheel torque distributed to the third wheel is driving; or if in the wheels in which no flat tire occurs, there is one wheel on the left side of the vehicle traveling direction, determine that, in the wheels in which no flat tire occurs, a wheel that is diagonal to the first wheel is the second wheel, where an action mode of the wheel torque distributed to the second wheel is driving, and determine that a remaining wheel other than the first wheel and the second wheel in the wheels in which no flat tire occurs is the third wheel, where an action mode of the wheel torque distributed to the third wheel is driving.

In an optional implementation, there are two wheels in which a flat tire occurs, and the processor 1301 is further configured to: determine a distribution order and an action mode of a wheel torque required for control based on a value of the additional yaw moment, positions of the wheels in which no flat tire occurs, and vertical forces of wheels in which no flat tire occurs, where a value of the wheel torque required for control is a quotient obtained by dividing a product of the additional yaw moment and a wheel diameter by an average track of the wheels; determine that an absolute value of a wheel torque distributed to a first wheel in the distribution order is a smaller value in an absolute value of the wheel torque required for control and a maximum road surface friction torque of the first wheel; when the absolute value of the wheel torque distributed to the first wheel is the maximum road surface friction torque of the first wheel, determine that an absolute value of a wheel torque distributed to a second wheel in the distribution order is a smaller value in a maximum road surface friction torque of the second wheel and an absolute value of a difference between the absolute value of the wheel torque required for control and the maximum road surface friction torque of the first wheel; and control the wheels in which the flat tire occurs, based on the distribution order and the action mode of the wheel torque required for control, the absolute value of the wheel torque distributed to the first wheel, and the absolute value of the wheel torque distributed to the second wheel. In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In an optional implementation, after the processor 1301 determines that the absolute value of the wheel torque distributed to the first wheel in the distribution order is the smaller value in the absolute value of the wheel torque required for control and the maximum road surface friction torque of the first wheel, the processor 1301 is further configured to: skip distributing the wheel torque to the second wheel when the absolute value of the wheel torque distributed to the first wheel is the absolute value of the wheel torque required for control; and control the wheels in which the flat tire occurs, based on the distribution order and the action mode of the wheel torque required for control and the absolute value of the wheel torque distributed to the first wheel. In this manner, the wheels in which no flat tire occurs may be sequentially driven or braked in the distribution order, so that the vehicle can quickly compensate for the yaw moment generated by the flat tire, and the vehicle runs more stably in a process of compensating for the yaw moment generated by the flat tire.

In an optional implementation, the processor 1301 is further configured to: when the additional yaw moment is less than zero, if both the wheels in which the flat tire occurs are wheels on a left side of a vehicle traveling direction, determine that, in the wheels in which no flat tire occurs, a wheel with a greater vertical force is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is braking; or if both the wheels in which the flat tire occurs are wheels on a right side of a vehicle traveling direction, determine that, in the wheels in which no flat tire occurs, a wheel with a greater vertical force is the first wheel, where an action mode of the wheel torque distributed to the first wheel is driving, and determine that a remaining wheel other than the first wheel in the wheels in which no flat tire occurs is the second wheel, where an action mode of the wheel torque distributed to the second wheel is driving; or if the wheels in which the flat tire occurs are not wheels on a same side of a vehicle traveling direction, determine that a wheel on a right side of the vehicle traveling direction is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is driving.

In an optional implementation, the processor 1301 is further configured to: when the additional yaw moment is greater than zero, if both the wheels in which the flat tire occurs are wheels on a left side of a vehicle traveling direction, determine that, in the wheels in which no flat tire occurs, a wheel with a greater vertical force is the first wheel, where an action mode of the wheel torque distributed to the first wheel is driving, and determine that a remaining wheel other than the first wheel in the wheels in which no flat tire occurs is the second wheel, where an action mode of the wheel torque distributed to the second wheel is driving; if both the wheels in which the flat tire occurs are wheels on a right side of a vehicle traveling direction, determine that, in the wheels in which no flat tire occurs, a wheel with a greater vertical force is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is braking; or if the wheels in which the flat tire occurs are not wheels on a same side of a vehicle traveling direction, determine that a wheel on a left side of the vehicle traveling direction is the first wheel, where an action mode of the wheel torque distributed to the first wheel is braking, and determine that a remaining wheel other than the first wheel in the wheels in which no flat tire occurs is the second wheel, where an action mode of the wheel torque distributed to the second wheel is driving.

In an optional implementation, there are three wheels in which the flat tire occurs, and the processor 1301 is specifically configured to: determine an action mode of a wheel torque required for control based on a value of the additional yaw moment and a position of a wheel in which no flat tire occurs, where a value of the wheel torque required for control is a quotient obtained by dividing a product of the additional yaw moment and a wheel diameter by an average track of the wheels; determine that an absolute value of a wheel torque distributed to the wheel in which no flat tire occurs is a smaller value in an absolute value of the wheel torque required for control and a maximum road surface friction torque of the wheel in which no flat tire occurs; and control the wheels in which the flat tire occurs, based on the action mode of the wheel torque required for control and the absolute value of the wheel torque distributed to the wheel in which no flat tire occurs.

In an optional implementation, the processor 1301 is further configured to: when the additional yaw moment is less than zero, if the wheel in which no flat tire occurs is a wheel on a left side of a vehicle traveling direction, determine that an action mode of the wheel torque distributed to the wheel in which no flat tire occurs is driving, or if the wheel in which no flat tire occurs is a wheel on a right side of a vehicle traveling direction, determine that an action mode of the wheel torque distributed to the wheel in which no flat tire occurs is braking; or when the additional yaw moment is greater than zero, if the wheel in which no flat tire occurs is a wheel on a left side of a vehicle traveling direction, determine that an action mode of the wheel torque distributed to the wheel in which no flat tire occurs is braking, or if the wheel in which no flat tire occurs is a wheel on a right side of a vehicle traveling direction, determine that an action mode of the wheel torque distributed to the wheel in which no flat tire occurs is driving.

For implementation of each operation in FIG. 13, refer to the corresponding description of the method embodiment shown in FIG. 2 or FIG. 10.

In the vehicle control device shown in FIG. 13, the lateral force interference compensation torque is added to the additional yaw moment of the vehicle in which the flat tire occurs, so that the additional yaw moment more accurately represents the torque required for controlling the vehicle in which the flat tire occurs, and the feedback gain may be calculated based on the absolute value of the desired yaw angular acceleration, so that the problem of the delayed response of the yaw rate of the vehicle in which the flat tire occurs can be alleviated. Therefore, the response time for adjusting the yaw rate of the vehicle in which the flat tire occurs to the desired yaw rate can be reduced. In this way, the yaw moment generated by the flat tire can be quickly compensated, and the yaw degree of the vehicle can be reduced, so that the vehicle travels in the direction as desired by the driver.

Another embodiment of the present invention provides a computer program product. When the computer program product is run on a computer, the method in the embodiment shown in FIG. 2 or FIG. 10 is implemented.

Another embodiment of the present invention provides a computer-readable storage medium. The computer-readable storage medium stores a computer program. When the computer program is executed by a computer, the method in the embodiment shown in FIG. 2 or FIG. 10 is implemented.

The foregoing descriptions are merely specific implementations of this application, but are not intended to limit the protection scope of this application. Any modification or replacement readily figured out by a person skilled in the art within the technical scope disclosed in this application shall fall within the protection scope of this application.

What is claimed is:

1. A method comprising:
    calculating a longitudinal force interference compensation torque of a vehicle and a lateral force interference compensation torque of the vehicle when a flat tire of the vehicle is detected;
    calculating a feedback control torque of the vehicle;
    obtaining an additional yaw moment based on the longitudinal force interference compensation torque, the feedback control torque, and the lateral force interference compensation torque; and
    controlling, based on the additional yaw moment, a wheel on which the flat tire is detect,
    wherein calculating the feedback control torque of the vehicle comprises:
    calculating an absolute value of a target yaw angular acceleration of the vehicle;
    calculating a feedback gain based on the absolute value of the target yaw angular acceleration; and
    calculating the feedback control torque based on the feedback gain,
    wherein calculating the feedback gain based on the absolute value of the target yaw angular acceleration comprises:
    obtaining, according to a first preset relationship, a first adjustment coefficient corresponding to the absolute value of the target yaw angular acceleration, wherein the first preset relationship indicates a mapping relationship between absolute values of a plurality of target yaw angular accelerations and a plurality of adjustment coefficients; and
    calculating the feedback gain based on the first adjustment coefficient,
    wherein the first preset relationship is:
    when the absolute value of the target yaw angular acceleration falls within $[0, n_1]$, the first adjustment coefficient is a, wherein a is a value in $[2, 5]$;
    when the absolute value of the target yaw angular acceleration falls within $[n_1, n_2]$, the first adjustment coefficient increases as the absolute value of the target yaw angular acceleration increases, and the first adjustment coefficient falls within $[a, b]$;
    when the absolute value of the target yaw angular acceleration falls within $[n_2, n_{th}]$, the first adjustment coefficient is b;
    when the absolute value of the target yaw angular acceleration falls within $[n_{th}, n_3]$, the first adjustment coefficient decreases as the absolute value of the target yaw angular acceleration increases, the first adjustment coefficient falls within $[b, c]$, and c is a value in $[0, 1]$; or
    when the absolute value of the target yaw angular acceleration falls within $[n_3, +\infty)$, the first adjustment coefficient is c.

2. The method according to claim 1, wherein there is one wheel in which the flat tire is detected, and controlling, based on the additional yaw moment, the wheel on which the flat tire is detected comprises:
    obtaining a distribution order and an action mode of a wheel torque for control based on a value of the additional yaw moment, a position of the wheel in which the flat tire is detected, and vertical forces of wheels in which no flat tire is detected, wherein a value of the wheel torque for control is a quotient obtained by dividing a product of the additional yaw moment and a wheel diameter by an average track of the wheels, wherein an absolute value of a wheel torque distributed to a first wheel in the distribution order is a smaller value of an absolute value of the wheel torque for control and a maximum road surface friction torque of the first wheel, and wherein:
    when the absolute value of the wheel torque distributed to the first wheel is the maximum road surface friction torque of the first wheel, an absolute value of a wheel torque distributed to a second wheel in the distribution order is a smaller value of a maximum road surface friction torque of the second wheel and an absolute value of a difference between the absolute value of the wheel torque for control and the maximum road surface friction torque of the first wheel, and
    when the absolute value of the wheel torque distributed to the second wheel is the maximum road surface friction torque of the second wheel, an absolute value of a wheel torque distributed to a third wheel in the distribution order is a smaller value of a maximum road surface friction torque of the third wheel and an absolute value of a difference between the maximum road surface friction torque of the second wheel and the difference between the absolute value of the wheel torque for control and the maximum road surface friction torque of the first wheel; and
    wherein controlling the wheel on which the flat tire is detected comprises:
    controlling the wheel on which the flat tire is detected, based on the distribution order and the action mode of the wheel torque for control, the absolute value of the wheel torque distributed to the first wheel, the absolute value of the wheel torque distributed to the second wheel, and the absolute value of the wheel torque distributed to the third wheel.

3. The method according to claim 2, further comprising:
    skipping distributing wheel torques to the second wheel and the third wheel when the absolute value of the wheel torque distributed to the first wheel is the absolute value of the wheel torque for control; and
    wherein controlling the wheel on which the flat tire is detected comprises:
    controlling the wheel on which the flat tire is detected, based on the distribution order and the action mode of the wheel torque for control and the absolute value of the wheel torque distributed to the first wheel.

4. The method according to claim 2, further comprising:
    skipping distributing the wheel torque to the third wheel when the absolute value of the wheel torque distributed to the second wheel is the absolute value of the difference between the absolute value of the wheel torque for control and the maximum road surface friction torque of the first wheel; and
    wherein controlling the wheel on which the flat tire is detected comprises:
    controlling the wheel in which the flat tire is detected, based on the distribution order and the action mode of the wheel torque for control, the absolute value of the wheel torque distributed to the first wheel, and the absolute value of the wheel torque distributed to the second wheel.

5. The method according to claim 2, wherein obtaining the distribution order and the action mode of the wheel torque for control based on the value of the additional yaw moment, the position of the wheel in which the flat tire is detected, and vertical forces of wheels in which no flat tire is detected comprises:
    when the additional yaw moment is less than zero, the first wheel is a wheel with a greater vertical force in wheels on a right side of a vehicle traveling direction in the wheels in which no flat tire is detected, wherein an action mode of the wheel torque distributed to the first wheel is braking; and when in the wheels on which no flat tire is detected, there are two wheels on a right side of a vehicle traveling direction, the second wheel is a wheel other than the first wheel in the wheels on the right side of the vehicle traveling direction, wherein an action mode of the wheel torque distributed to the second wheel is braking, the third wheel is a remaining wheel other than the first wheel and the second wheel in the wheels on which no flat tire is detected, and wherein an action mode of the wheel torque distributed to the third wheel is driving;

when in the wheels on which no flat tire is detected, there is one wheel on the right side of the vehicle traveling direction, the second wheel is a wheel that is diagonal to the first wheel in the wheels on which no flat tire is detected, wherein an action mode of the wheel torque distributed to the second wheel is driving, and the third wheel is a remaining wheel other than the first wheel and the second wheel in the wheels on which no flat tire is detected, and wherein an action mode of the wheel torque distributed to the third wheel is driving.

6. The method according to claim 2, wherein obtaining the distribution order and the action mode of the wheel torque for control based on the value of the additional yaw moment, the position of the wheel on which the flat tire is detected, and vertical forces of the wheels on which no flat tire occurs is detected:

when the additional yaw moment is greater than zero, the first wheel is a wheel with a greater vertical force in wheels on a left side of a vehicle traveling direction in the wheels on which no flat tire is detected, wherein an action mode of the wheel torque distributed to the first wheel is braking;

when in the wheels on which no flat tire is detected, there are two wheels on the left side of the vehicle traveling direction, the second wheel is a wheel other than the first wheel in the wheels on the left side of the vehicle traveling direction, wherein an action mode of the wheel torque distributed to the second wheel is braking, and the third wheel is a remaining wheel other than the first wheel and the second wheel in the wheels on which no flat tire is detected, and wherein an action mode of the wheel torque distributed to the third wheel is driving;

when in the wheels on which no flat tire is detected, there is one wheel on the left side of the vehicle traveling direction, the second wheel is a wheel that is diagonal to the first wheel in the wheels on which no flat tire is detected, wherein an action mode of the wheel torque distributed to the second wheel is driving, and the third wheel is a remaining wheel other than the first wheel and the second wheel in the wheels on which no flat tire is detected, and wherein an action mode of the wheel torque distributed to the third wheel is driving.

7. The method according to claim 1, wherein there are a first tire and a second tire on each of which a flat tire is detected, and the step of controlling a wheel in which the flat tire is detected based on the additional yaw moment of claim 1 controls both the first tire and the second tire and comprises:

obtaining a distribution order and an action mode of a wheel torque for control based on a value of the additional yaw moment, positions of the first and second wheels, and vertical forces of wheels on which no flat tire is detected, wherein a value of the wheel torque required for control is a quotient obtained by dividing a product of the additional yaw moment and a wheel diameter by an average track of the wheels;

obtaining that an absolute value of a wheel torque distributed to the first wheel in the distribution order is a smaller value of an absolute value of the wheel torque for control and a maximum road surface friction torque of the first wheel, wherein when the absolute value of the wheel torque distributed to the first wheel is the maximum road surface friction torque of the first wheel, an absolute value of a wheel torque distributed to the second wheel in the distribution order is a smaller value of a maximum road surface friction torque of the second wheel and an absolute value of a difference between the absolute value of the wheel torque for control and the maximum road surface friction torque of the first wheel; and controlling the first and second wheels based on the distribution order and the action mode of the wheel torque for control, the absolute value of the wheel torque distributed to the first wheel, and the absolute value of the wheel torque distributed to the second wheel.

8. The method according to claim 7, further comprising:

skipping distributing the wheel torque to the second wheel when the absolute value of the wheel torque distributed to the first wheel is the absolute value of the wheel torque for control; and wherein controlling the first and second wheels comprises:

controlling the first and second wheels based on the distribution order and the action mode of the wheel torque for control and the absolute value of the wheel torque distributed to the first wheel.

9. The method according to claim 7, wherein obtaining the distribution order and the action mode of the wheel torque for control based on the value of the additional yaw moment, the positions of the first and second wheels, and vertical forces of the wheels on which no flat tire is detected comprises:

when the additional yaw moment is less than zero, and when both the first and second wheels are wheels on a left side of a vehicle traveling direction, the first wheel is a wheel with a greater vertical force in the wheels on which no flat tire is detected, wherein an action mode of the wheel torque distributed to the first wheel is braking, and the second wheel is a remaining wheel other than the first wheel in the wheels in which no flat tire is detected, and wherein an action mode of the wheel torque distributed to the second wheel is braking;

when both the first and second wheels are wheels on a right side of a vehicle traveling direction, the first wheel is a wheel with a greater vertical force in the wheels on which no flat tire is detected, wherein an action mode of the wheel torque distributed to the first wheel is driving, and the second wheel is a remaining wheel other than the first wheel in the wheels on which no flat tire is detected, and wherein an action mode of the wheel torque distributed to the second wheel is driving; and when the first and second wheels are not wheels on a same side of a vehicle traveling direction, the first wheel is a wheel on a right side of the vehicle traveling direction, wherein an action mode of the wheel torque distributed to the first wheel is braking, and the second wheel is a remaining wheel other than the first wheel in the wheels on which no flat tire is detected, and wherein an action mode of the wheel torque distributed to the second wheel is driving.

10. The method according to claim 7, wherein obtaining the distribution order and the action mode of the wheel torque for control based on the value of the additional yaw moment, the positions of the wheels in which the flat tires are detected, and vertical forces of the wheels in which no flat tires are detected comprises:
when the additional yaw moment is greater than zero, and
when both the wheels in which the flat tires are detected are wheels on a left side of a vehicle traveling direction, the first wheel is a wheel with a greater vertical force in the wheels in which no flat tire is detected, wherein an action mode of the wheel torque distributed to the first wheel is driving, and the second wheel is a remaining wheel other than the first wheel in the wheels on which no flat tire is detected, wherein an action mode of the wheel torque distributed to the second wheel is driving;
when both the first and second wheels are on a right side of a vehicle traveling direction, the first wheel is a wheel with a greater vertical force in the wheels on which no flat tire is detected, wherein an action mode of the wheel torque distributed to the first wheel is braking, and the second wheel is a remaining wheel other than the first wheel in the wheels on which no flat tire is detected, wherein an action mode of the wheel torque distributed to the second wheel is braking; and
when the first and second wheels are not wheels on a same side of a vehicle traveling direction, the first wheel a wheel on a left side of the vehicle traveling direction, wherein an action mode of the wheel torque distributed to the first wheel is braking, and the second wheel is a remaining wheel other than the first wheel in the wheels in which no flat tire is detected, wherein an action mode of the wheel torque distributed to the second wheel is driving.

11. A vehicle control device comprising:
at least one processor; and
a non-transitory computer-readable storage medium coupled to the at least one processor and storing programming instructions for execution by the at least one processor, the programming instructions instructing the at least one processor to perform the following operations:
calculating a longitudinal force interference compensation torque of a vehicle and a lateral force interference compensation torque of the vehicle when a flat tire of the vehicle is detected;
calculating a feedback control torque of the vehicle;
obtaining an additional yaw moment based on the longitudinal force interference compensation torque, the feedback control torque, and the lateral force interference compensation torque; and
controlling, based on the additional yaw moment, a wheel on which the flat tire is detected,
wherein calculating the feedback control torque of the vehicle comprises:
calculating an absolute value of a target yaw angular acceleration of the vehicle;
calculating a feedback gain based on the absolute value of the target yaw angular acceleration; and
calculating the feedback control torque based on the feedback gain,
wherein calculating the feedback gain based on the absolute value of the target yaw angular acceleration comprises:
obtaining, according to a first preset relationship, a first adjustment coefficient corresponding to the absolute value of the target yaw angular acceleration, wherein the first preset relationship indicates a mapping relationship between absolute values of a plurality of target yaw angular accelerations and a plurality of adjustment coefficients; and
calculating the feedback gain based on the first adjustment coefficient,
wherein the first preset relationship is:
when the absolute value of the target yaw angular acceleration falls within [0, $n_1$], the first adjustment coefficient is a, wherein a is a value in [2, 5];
when the absolute value of the target yaw angular acceleration falls within [$n_1$, $n_2$], the first adjustment coefficient increases as the absolute value of the target yaw angular acceleration increases, wherein the adjustment coefficient falls within [a, b];
when the absolute value of the target yaw angular acceleration falls within [$n_2$, $n_{th}$], the first adjustment coefficient is b;
when the absolute value of the target yaw angular acceleration falls within [$n_{th}$, $n_3$], the first adjustment coefficient decreases as the absolute value of the target yaw angular acceleration increases, wherein the first adjustment coefficient falls within [b, c], and c is a value in [0, 1]; or
when the absolute value of the target yaw angular acceleration falls within [$n_3$, +∞), the first adjustment coefficient is c.

12. The device according to claim 11, wherein there is one wheel on which the flat tire is detected, and the programming instructions further instruct the at least one processor to perform the following operation steps:
obtaining a distribution order and an action mode of a wheel torque for control based on a value of the additional yaw moment, a position of the wheel on which the flat tire is detected, and vertical forces of wheels on which no flat tire is detected, wherein a value of the wheel torque for control is a quotient obtained by dividing a product of the additional yaw moment and a wheel diameter by an average track of the wheels, wherein an absolute value of a wheel torque distributed to a first wheel in the distribution order is a smaller value of an absolute value of the wheel torque for control and a maximum road surface friction torque of the first wheel, and wherein:
when the absolute value of the wheel torque distributed to the first wheel is the maximum road surface friction torque of the first wheel, an absolute value of a wheel torque distributed to a second wheel in the distribution order is a smaller value in a maximum road surface friction torque of the second wheel and an absolute value of a difference between the absolute value of the wheel torque for control and the maximum road surface friction torque of the first wheel; and
when the absolute value of the wheel torque distributed to the second wheel is the maximum road surface friction torque of the second wheel, an absolute value of a wheel torque distributed to a third wheel in the distribution order is a smaller value in a maximum road surface friction torque of the third wheel and an absolute value of a difference between the maximum road surface friction torque of the second wheel and the difference between the absolute value of the wheel torque for control and the maximum road surface friction torque of the first wheel; and wherein controlling the wheel on which the flat tire is detected comprises:

controlling the wheel on which the flat tire is detected, based on the distribution order and the action mode of the wheel torque for control, the absolute value of the wheel torque distributed to the first wheel, the absolute value of the wheel torque distributed to the second wheel, and the absolute value of the wheel torque distributed to the third wheel.

13. The device according to claim 12, wherein the programming instructions further instruct the at least one processor to perform the following operation steps:

skipping distributing the wheel torques to the second wheel and the third wheel when the absolute value of the wheel torque distributed to the first wheel is the absolute value of the wheel torque required for control; and wherein controlling the wheel on which the flat tire is detected comprises:

controlling the wheel in which the flat tire occurs, based on the distribution order and the action mode of the wheel torque required for control and the absolute value of the wheel torque distributed to the first wheel.

14. The device according to claim 12, wherein the programming instructions further instruct the at least one processor to perform the following operation steps:

skipping distributing the wheel torque to the third wheel when the absolute value of the wheel torque distributed to the second wheel is the absolute value of the difference between the absolute value of the wheel torque for control and the maximum road surface friction torque of the first wheel; and wherein controlling the wheel on which the flat tire is detected comprises:

controlling the wheel on which the flat tire is detected, based on the distribution order and the action mode of the wheel torque for control, the absolute value of the wheel torque distributed to the first wheel, and the absolute value of the wheel torque distributed to the second wheel.

* * * * *